United States Patent
Rowe et al.

(10) Patent No.: US 11,601,075 B2
(45) Date of Patent: Mar. 7, 2023

(54) LAYERED ACTUATION STRUCTURES COMPRISING ARTIFICIAL MUSCLES AND CONNECTING LEDGES

(71) Applicant: Toyota Motor Engineering & Manufacturing North America, Inc., Plano, TX (US)

(72) Inventors: Michael P. Rowe, Pinckney, MI (US); Shardul S. Panwar, Ann Arbor, MI (US); Maduran Palaniswamy, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 169 days.

(21) Appl. No.: 17/217,054

(22) Filed: Mar. 30, 2021

(65) Prior Publication Data
US 2022/0321033 A1 Oct. 6, 2022

(51) Int. Cl.
*H02N 11/00* (2006.01)
*B25J 9/12* (2006.01)

(52) U.S. Cl.
CPC ............ *H02N 11/006* (2013.01); *B25J 9/12* (2013.01)

(58) Field of Classification Search
CPC ...... H02N 11/006; H02N 11/00; H02N 1/002; B25J 9/12; B25J 9/1095; B25J 9/142; B25J 9/1075
See application file for complete search history.

(56) References Cited

U.S. PATENT DOCUMENTS

| 6,411,013 B1 * | 6/2002 | Horning ................. H02N 1/006 310/330 |
| 6,555,945 B1 * | 4/2003 | Baughman .............. F03G 7/005 136/291 |

(Continued)

FOREIGN PATENT DOCUMENTS

| CN | 207382213 U | 5/2018 |
| JP | 2009000366 A | 1/2009 |

(Continued)

OTHER PUBLICATIONS

Acome "Hydraulically Amplified Self-healing Electrostatic Actuators with Muscle-like Performance" Science, Jan. 5, 2018, pp. 61-65, DOI: 10.1126/science.aao6139, American Association for the Advancement of Science, Washington, DC.

*Primary Examiner* — Burton S Mullins
(74) *Attorney, Agent, or Firm* — Dinsmore & Shohl LLP

(57) ABSTRACT

A layered actuation structure includes a first platform pair and a second platform pair. Each of the first platform pair and the second platform pair include an actuation platform and a mounting platform, forming an actuation cavity of each of the first platform pair and the second platform pair. One or more connecting ledges of each platform pair couple at least one of the actuation platform and the mounting platform of each platform pair to at least one of an actuation arm and a support arm, respectively. A collective stiffness of the one or more connecting ledges of the first platform pair is different than a collective stiffness of the one or more connecting ledges of the second platform pair. The layered actuation structure also includes one or more artificial muscles disposed in the actuation cavity of the first platform pair and the second platform pair.

20 Claims, 13 Drawing Sheets

(56) References Cited

U.S. PATENT DOCUMENTS

| | | | | |
|---|---|---|---|---|
| 6,646,364 B1 * | 11/2003 | Horning | ............... | H02N 1/006 |
| | | | | 310/309 |
| 7,154,362 B2 * | 12/2006 | Ohnstein | ............... | B25J 9/065 |
| | | | | 335/229 |
| 8,405,277 B2 * | 3/2013 | Goyal | ............... | F03G 7/005 |
| | | | | 310/331 |
| 10,797,217 B2 | 10/2020 | Hakkens et al. | | |
| 2016/0027995 A1 * | 1/2016 | Wagner | ............... | H01L 41/09 |
| | | | | 310/300 |

FOREIGN PATENT DOCUMENTS

| | | | |
|---|---|---|---|
| JP | 4385091 | B2 | 12/2009 |
| KR | 101797398 | B1 | 11/2017 |
| WO | 2019173227 | A1 | 9/2019 |

* cited by examiner

US 11,601,075 B2

LAYERED ACTUATION STRUCTURES COMPRISING ARTIFICIAL MUSCLES AND CONNECTING LEDGES

TECHNICAL FIELD

The present specification generally relates to layered actuation structures actuated by artificial muscles, in particular, to layered actuation structures including platforms having connecting ledges.

BACKGROUND

Current robotic technologies rely on rigid components, such as servomotors to perform tasks, often in a structured environment. This rigidity presents limitations in many robotic applications, caused, at least in part, by the weight-to-power ratio of servomotors and other rigid robotics devices. The field of soft robotics improves on these limitations by using artificial muscles and other soft actuators. Artificial muscles attempt to mimic the versatility, performance, and reliability of a biological muscle. Some artificial muscles rely on fluidic actuators, but fluidic actuators require a supply of pressurized gas or liquid, and fluid transport must occur through systems of channels and tubes, limiting the speed and efficiency of the artificial muscles. Other artificial muscles use thermally activated polymer fibers, but these are difficult to control and operate at low efficiencies.

One particular artificial muscle design is described in the paper titled "Hydraulically amplified self-healing electrostatic actuators with muscle-like performance" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). These hydraulically amplified self-healing electrostatic (HASEL) actuators use electrostatic and hydraulic forces to achieve a variety of actuation modes. However, HASEL actuator artificial muscles have a limited actuator power per unit volume. Furthermore, HASEL actuator artificial muscles and other known artificial muscles are difficult to combine in a small footprint while increasing the achievable collective force of these artificial muscle combinations.

Accordingly, a need exists for improved artificial muscles and actuation structures to increase actuator power per unit volume in a small footprint

SUMMARY

In one embodiment, a layered actuation structure includes a first platform pair and a second platform pair. Each of the first platform pair and the second platform pair include an actuation platform and a mounting platform, forming an actuation cavity between the actuation platform and the mounting platform of each of the first platform pair and the second platform pair. One or more connecting ledges of each platform pair couple at least one of the actuation platform and the mounting platform of each platform pair to at least one of an actuation arm and a support arm, respectively. A collective stiffness of the one or more connecting ledges of the first platform pair is different than a collective stiffness of the one or more connecting ledges of the second platform pair. The layered actuation structure also includes one or more artificial muscles disposed in the actuation cavity of the first platform pair and the second platform pair.

In another embodiment, a method for actuating a layered actuation structure includes providing a voltage using a power supply electrically coupled to an electrode pair of one or more artificial muscles, where at least one of the one or more artificial muscles are disposed in each of a first and second actuation cavity, where the first actuation cavity is formed between an actuation platform of a first platform pair and a mounting platform of the first platform pair, and the second actuation cavity is formed between an actuation platform of a second platform pair and a mounting platform of the second platform pair. One or more connecting ledges of each platform pair couple at least one of the actuation platform and the mounting platform of each platform pair to at least one of an actuation arm and a support arm, respectively. A collective stiffness of the one or more connecting ledges of the first platform pair is different than a collective stiffness of the one or more connecting ledges of the second platform pair. The method also includes applying the voltage to the electrode pair of at least one artificial muscle disposed in one of the first and second actuation cavities, thereby actuating the electrode pair of the at least one artificial muscle from a non-actuated state to an actuated state thereby applying pressure to an actuation platform, generating a translational motion of the actuation platform.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to a layered actuation structure having one or more actuation platforms interleaved with one or more mounting platforms. Adjacent individual actuation platforms and mounting platforms form platform pairs having an actuation cavity between the actuation platform and the mounting platform. Platform pairs are connected to one another using platform linking arms, including at least a support arm and an actuation arm. The platform pairs may be coupled to the platform linking arms with connecting ledges. That is, the platform linking arms may include engaging slots for accepting one or more connecting ledges of the platform pairs. Artificial muscles are disposed in the actuation cavity of each platform pair and are expandable on demand to selectively raise the actuation platforms. In particular, the one or more artificial muscles each include an electrode pair that may be drawn together by application of a voltage, thereby pushing dielectric fluid into an expandable fluid region, expanding the expandable fluid region, raising a portion of the artificial muscle on demand. Expansion of the expandable fluid regions apply pressure to the one or more actuation platforms, generating translational motion of the one or more actuation platforms. In operation, the translational motion of each of the one or more actuation platforms generates an additive force. A load applied to an actuation or load supporting surface of the layered actuation structure is distributed throughout the layered actuation structure. More specifically, the applied load is distributed to each platform pair, and particularly to the artificial muscles disposed within the actuation cavity of each platform pair. Depending on the collective stiffness of the connecting ledges of each platform pair, the proportional distribution of the applied load to each platform pair of the layered actuation structure may be particularly controlled.

Figure 1:
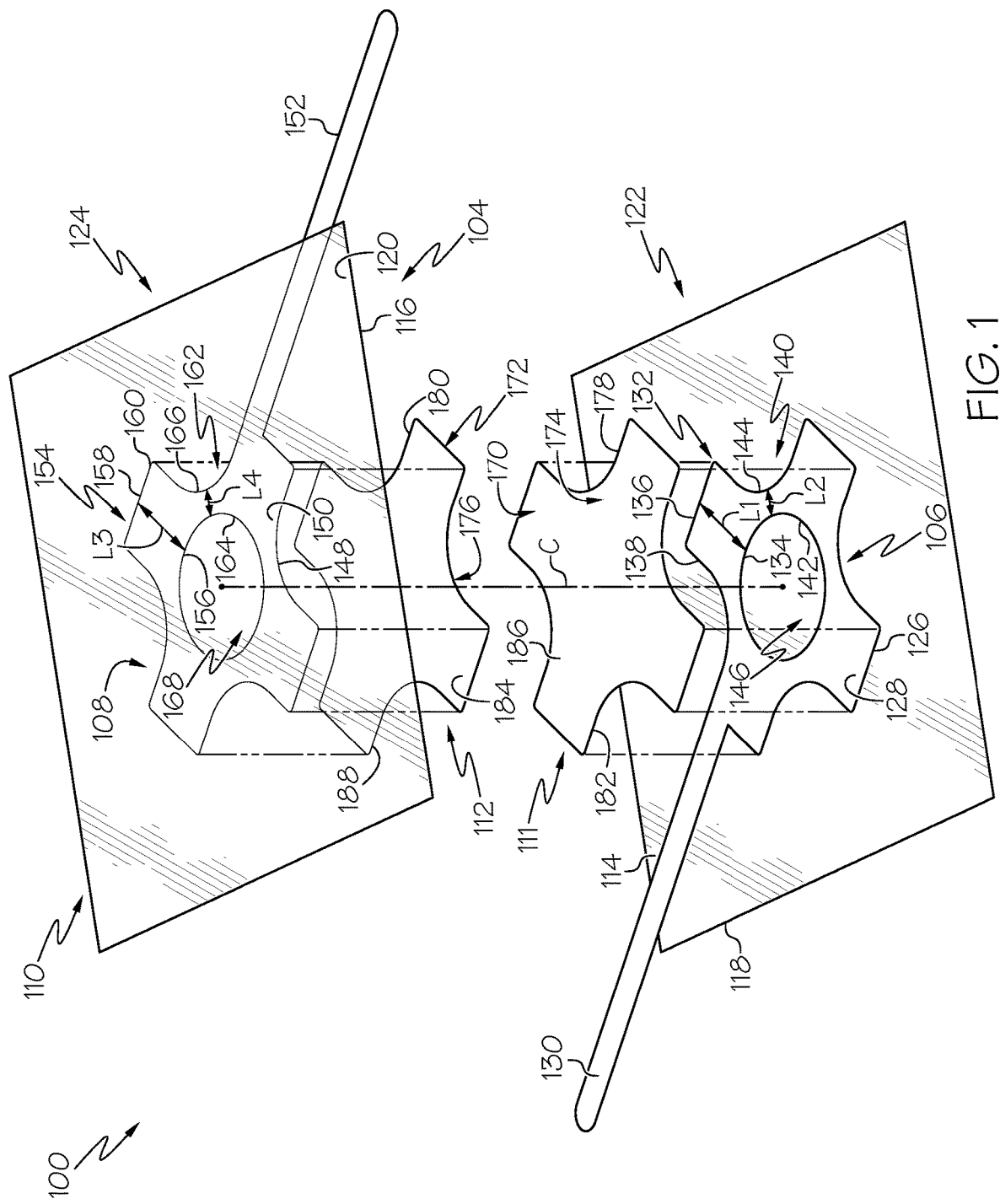
FIG. 1 schematically depicts an exploded view of an illustrative artificial muscle, according to one or more embodiments shown and described herein.
Figure 2:
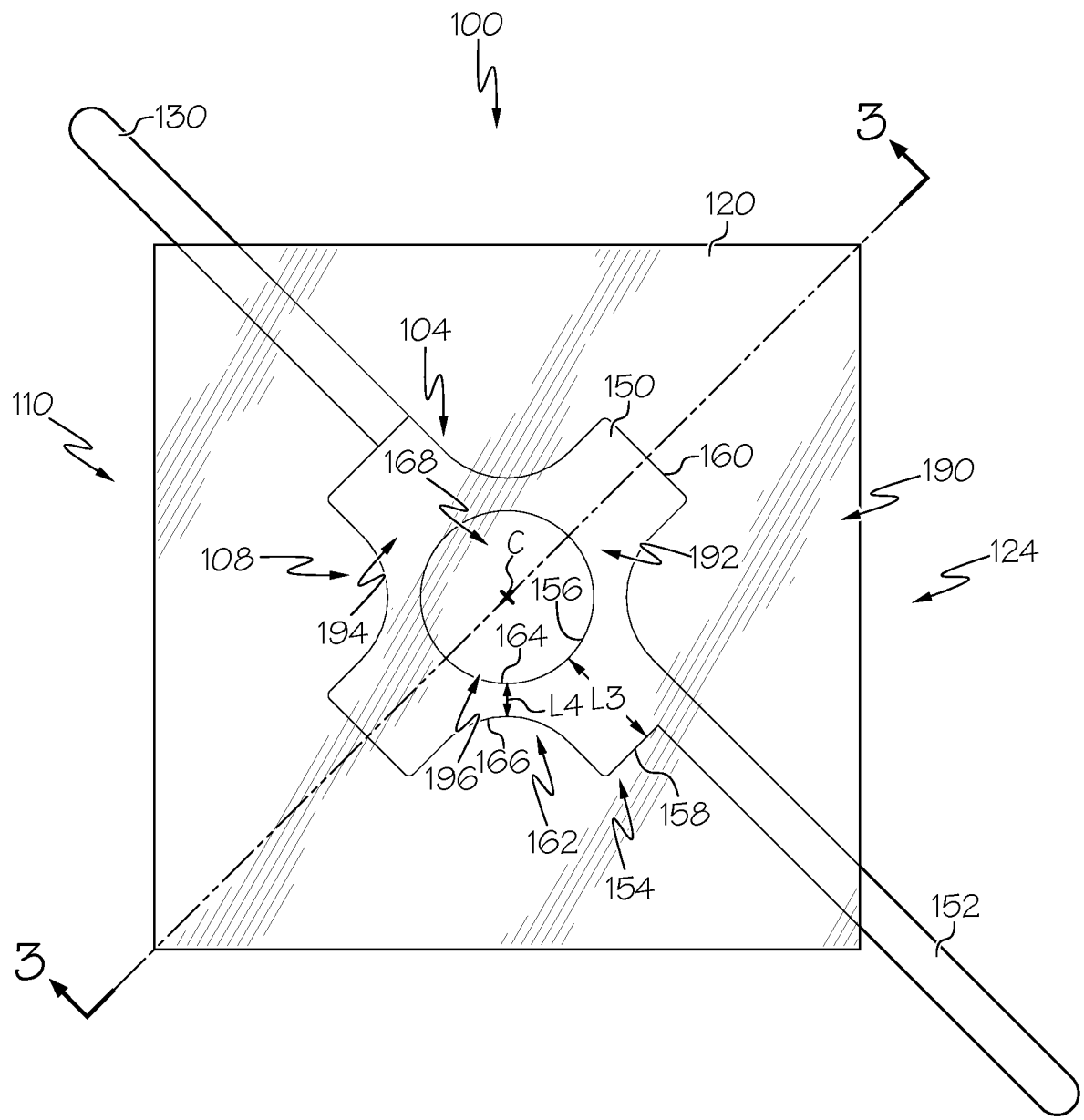
FIG. 2 schematically depicts a top view of the artificial muscle of FIG. 1, according to one or more embodiments shown and described herein.

Referring now to FIGS. 1 and 2, an example artificial muscle 100 that may be disposed in an artificial muscle stack and in a layered actuation structure 500 (FIGS. 8A-10) is schematically depicted. The artificial muscle 100 comprises a housing 110, the electrode pair 104, including a first electrode 106 and a second electrode 108, fixed to opposite surfaces of the housing 110, a first electrical insulator layer 111 fixed to the first electrode 106, and a second electrical insulator layer 112 fixed to the second electrode 108. In some embodiments, the housing 110 is a one-piece monolithic layer including a pair of opposite inner surfaces, such as a first inner surface 114 and a second inner surface 116, and a pair of opposite outer surfaces, such as a first outer surface 118 and a second outer surface 120. In some embodiments, the first inner surface 114 and the second inner surface 116 of the housing 110 are heat-sealable. In other embodiments, the housing 110 may be a pair of individually fabricated film layers, such as a first film layer 122 and a second film layer 124. Thus, the first film layer 122 includes the first inner surface 114 and the first outer surface 118, and the second film layer 124 includes the second inner surface 116 and the second outer surface 120.

While the embodiments described herein primarily refer to the housing 110 as comprising the first film layer 122 and the second film layer 124, as opposed to the one-piece housing, it should be understood that either arrangement is contemplated. In some embodiments, the first film layer 122 and the second film layer 124 generally include the same structure and composition. For example, in some embodiments, the first film layer 122 and the second film layer 124 each comprises biaxially oriented polypropylene.

The first electrode 106 and the second electrode 108 are each positioned between the first film layer 122 and the second film layer 124. In some embodiments, the first electrode 106 and the second electrode 108 are each aluminum-coated polyester such as, for example, Mylar®. In addition, one of the first electrode 106 and the second electrode 108 is a negatively charged electrode and the other of the first electrode 106 and the second electrode 108 is a positively charged electrode. For purposes discussed herein, either electrode 106, 108 may be positively charged so long as the other electrode 106, 108 of the artificial muscle 100 is negatively charged.

Figure 12:
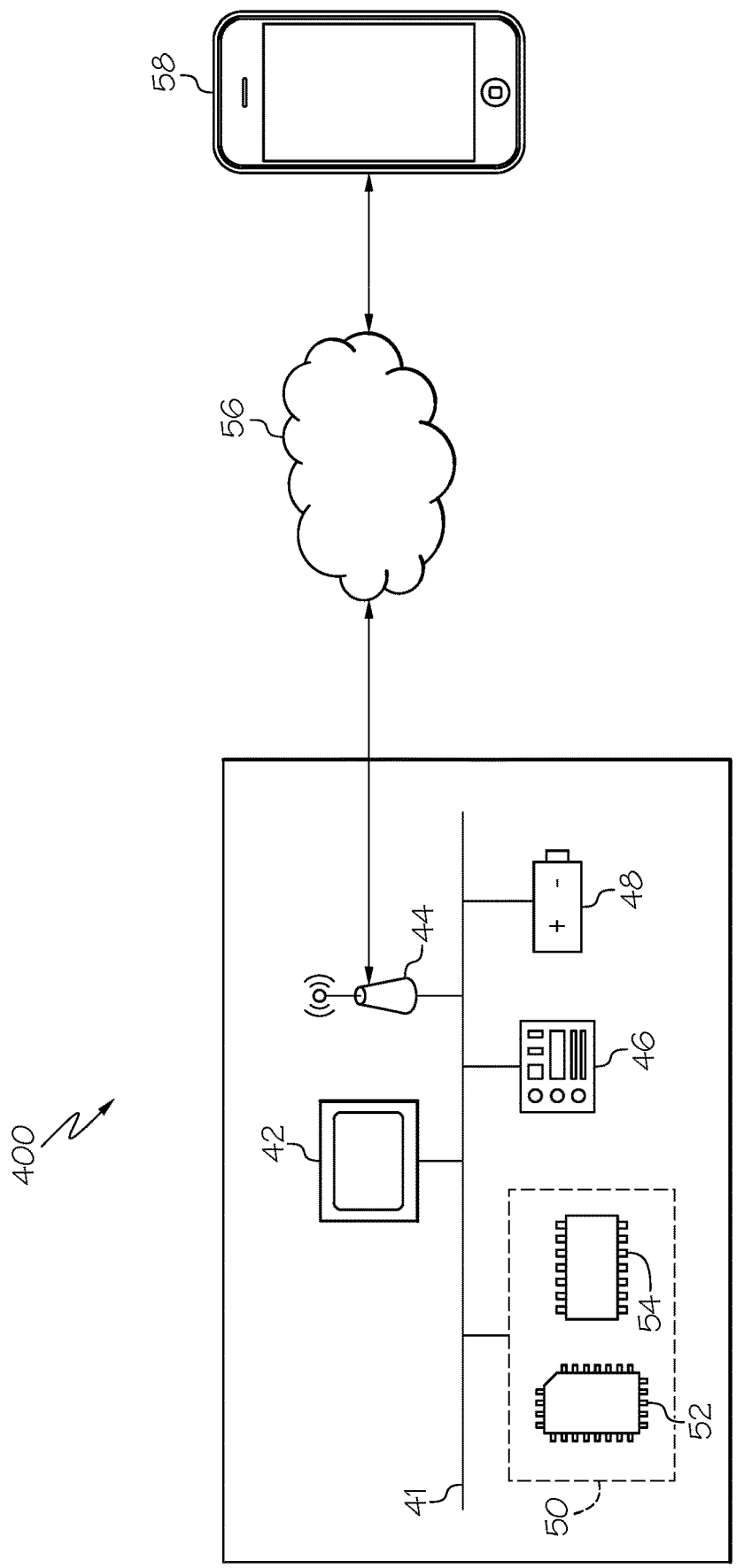
FIG. 12 schematically depicts an actuation system for operating the layered actuation structures of FIGS. 8A-10, according to one or more embodiments shown and described herein.

The first electrode 106 has a film-facing surface 126 and an opposite inner surface 128. The first electrode 106 is positioned against the first film layer 122, specifically, the first inner surface 114 of the first film layer 122. In addition, the first electrode 106 includes a first terminal 130 extending from the first electrode 106 past an edge of the first film layer 122 such that the first terminal 130 can be connected to a power supply to actuate the first electrode 106. Specifically, the terminal is coupled, either directly or in series, to a power supply and a controller of an actuation system 400 (FIG. 12). Similarly, the second electrode 108 has a film-facing surface 148 and an opposite inner surface 150. The second electrode 108 is positioned against the second film layer 124, specifically, the second inner surface 116 of the second film layer 124. The second electrode 108 includes a second terminal 152 extending from the second electrode 108 past an edge of the second film layer 124 such that the second terminal 152 can be connected to a power supply and a controller of the actuation system 400 to actuate the second electrode 108.

The first electrode 106 includes two or more tab portions 132 and two or more bridge portions 140. Each bridge portion 140 is positioned between adjacent tab portions 132, interconnecting these adjacent tab portions 132. Each tab portion 132 has a first end 134 extending radially from a center axis C of the first electrode 106 to an opposite second end 136 of the tab portion 132, where the second end 136 defines a portion of an outer perimeter 138 of the first electrode 106. Each bridge portion 140 has a first end 142 extending radially from the center axis C of the first electrode 106 to an opposite second end 144 of the bridge portion 140 defining another portion of the outer perimeter 138 of the first electrode 106. Each tab portion 132 has a tab length L1 and each bridge portion 140 has a bridge length L2 extending in a radial direction from the center axis C of the first electrode 106. The tab length L1 is a distance from the first end 134 to the second end 136 of the tab portion 132 and the bridge length L2 is a distance from the first end 142 to the second end 144 of the bridge portion 140. The tab length L1 of each tab portion 132 is longer than the bridge length L2 of each bridge portion 140. In some embodiments, the bridge length L2 is 20% to 50% of the tab length L1, such as 30% to 40% of the tab length L1.

In some embodiments, the two or more tab portions 132 are arranged in one or more pairs of tab portions 132. Each pair of tab portions 132 includes two tab portions 132 arranged diametrically opposed to one another. In some embodiments, the first electrode 106 may include only two tab portions 132 positioned on opposite sides or ends of the first electrode 106. In some embodiments, as shown in FIGS. 1 and 2, the first electrode 106 includes four tab portions 132 and four bridge portions 140 interconnecting adjacent tab portions 132. In this embodiment, the four tab portion 132 are arranged as two pairs of tab portions 132 diametrically opposed to one another. Furthermore, as shown, the first terminal 130 extends from the second end 136 of one of the tab portions 132 and is integrally formed therewith.

Like the first electrode 106, the second electrode 108 includes at least a pair of tab portions 154 and two or more bridge portions 162. Each bridge portion 162 is positioned between adjacent tab portions 154, interconnecting these adjacent tab portions 154. Each tab portion 154 has a first end 156 extending radially from a center axis C of the second electrode 108 to an opposite second end 158 of the tab portion 154, where the second end 158 defines a portion of an outer perimeter 160 of the second electrode 108. Due to the first electrode 106 and the second electrode 108 being coaxial with one another, the center axis C of the first electrode 106 and the second electrode 108 are the same. Each bridge portion 162 has a first end 164 extending radially from the center axis C of the second electrode to an opposite second end 166 of the bridge portion 162 defining another portion of the outer perimeter 160 of the second electrode 108. Each tab portion 154 has a tab length L3 and each bridge portion 162 has a bridge length L4 extending in a radial direction from the center axis C of the second electrode 108. The tab length L3 is a distance from the first end 156 to the second end 158 of the tab portion 154 and the bridge length L4 is a distance from the first end 164 to the second end 166 of the bridge portion 162. The tab length L3 is longer than the bridge length L4 of each bridge portion 162. In some embodiments, the bridge length L4 is 20% to 50% of the tab length L3, such as 30% to 40% of the tab length L3.

In some embodiments, the two or more tab portions 154 are arranged in one or more pairs of tab portions 154. Each pair of tab portions 154 includes two tab portions 154 arranged diametrically opposed to one another. In some embodiments, the second electrode 108 may include only two tab portions 154 positioned on opposite sides or ends of the first electrode 106. In some embodiments, as shown in FIGS. 1 and 2, the second electrode 108 includes four tab portions 154 and four bridge portions 162 interconnecting adjacent tab portions 154. In this embodiment, the four tab portions 154 are arranged as two pairs of tab portions 154 diametrically opposed to one another. Furthermore, as shown, the second terminal 152 extends from the second end 158 of one of the tab portions 154 and is integrally formed therewith.

Figure 3A:
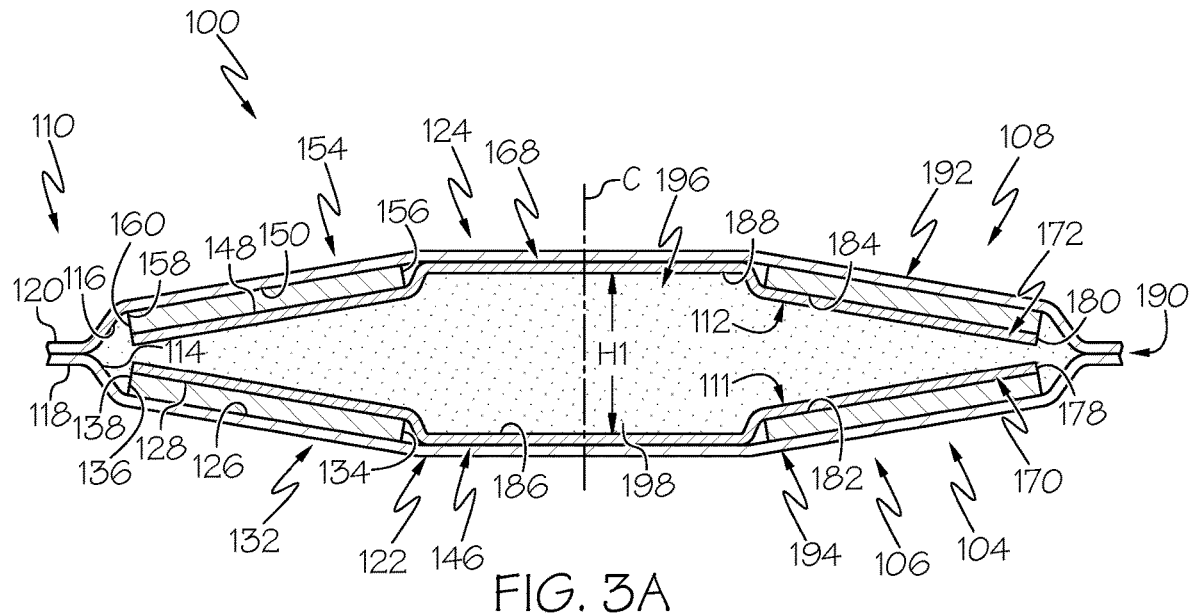
FIG. 3A schematically depicts a cross-sectional view of the artificial muscle of FIGS. 1 and 2 taken along line 3-3 in FIG. 2 in a non-actuated state, according to one or more embodiments shown and described herein.
Figure 3B:
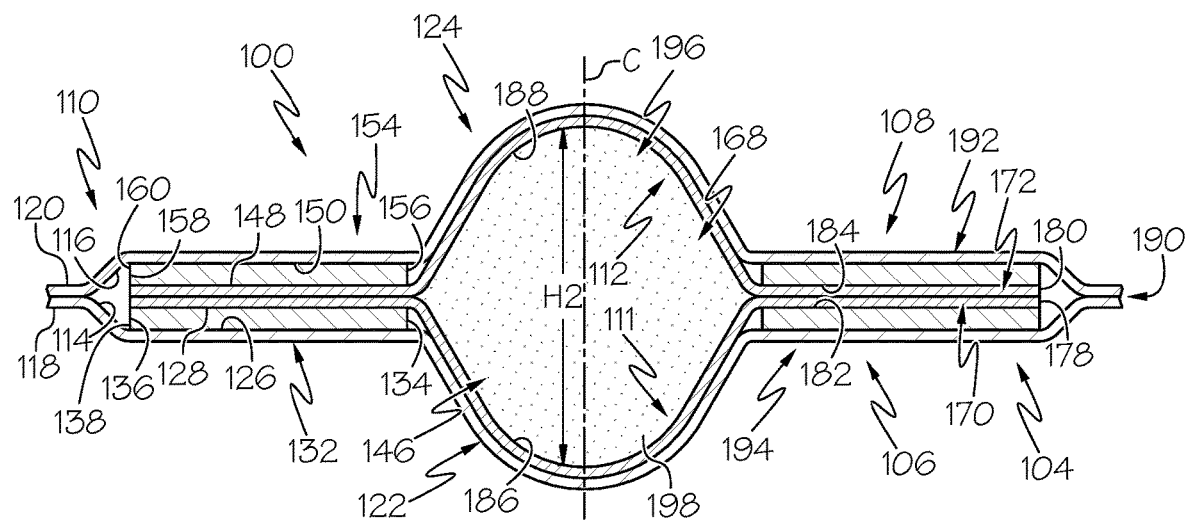
FIG. 3B schematically depicts a cross-sectional view of the artificial muscle of FIGS. 1 and 2 taken along line 3-3 in FIG. 2 in an actuated state, according to one or more embodiments shown and described herein.
Figure 4A:
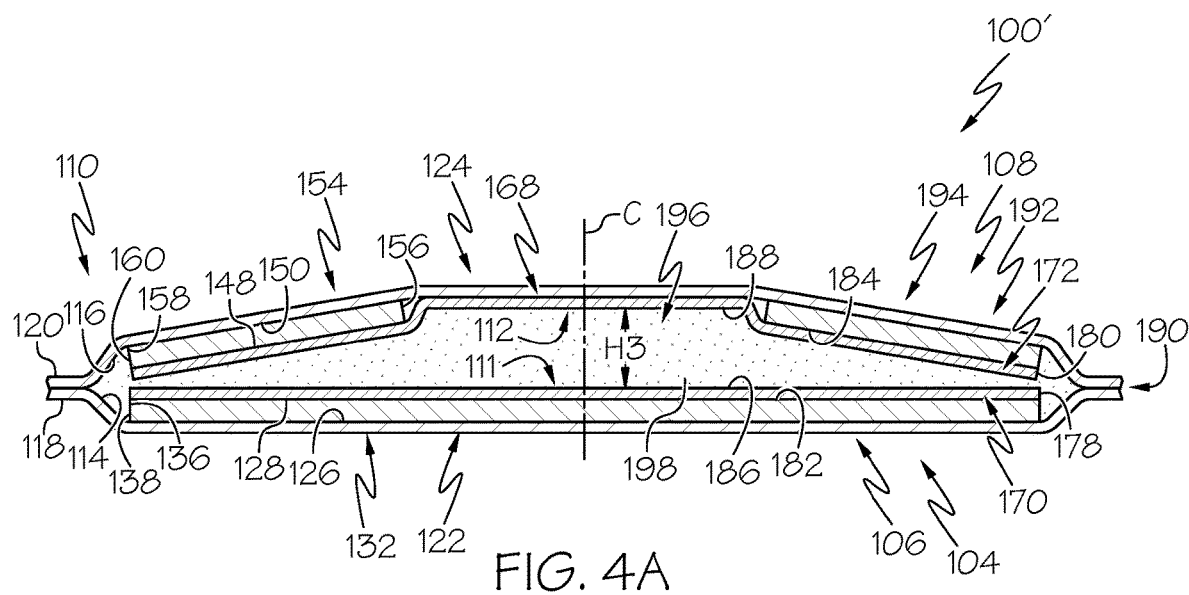
FIG. 4A schematically depicts a cross-sectional view of another illustrative artificial muscle in a non-actuated state, according to one or more embodiments shown and described herein.
Figure 4B:
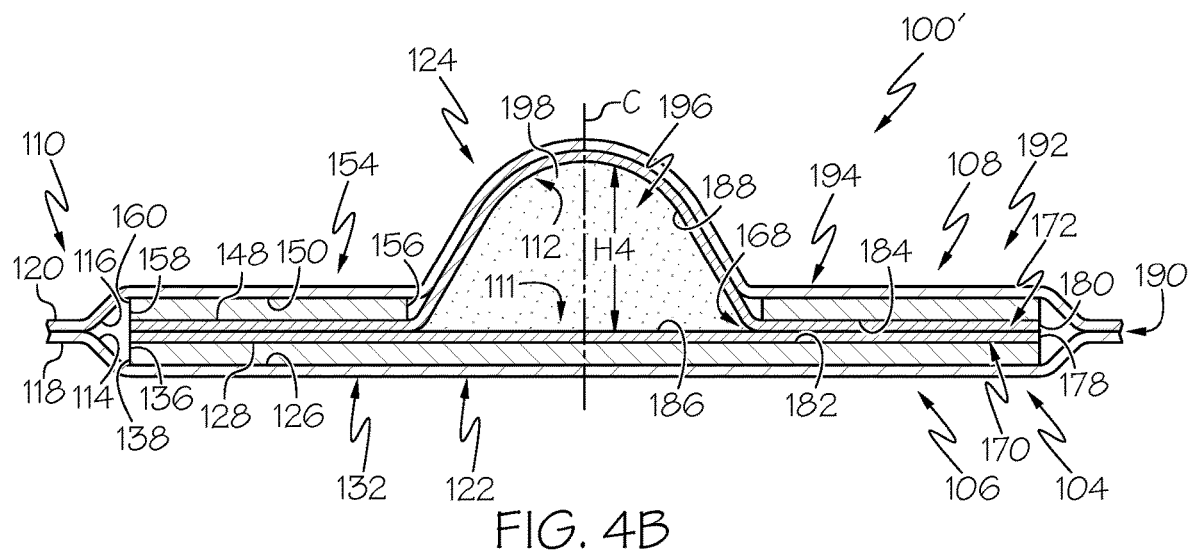
FIG. 4B schematically depicts a cross-sectional view of the artificial muscle of FIG. 4A in an actuated state, according to one or more embodiments shown and described herein.

Referring now to FIGS. 1-4B, at least one of the first electrode 106 and the second electrode 108 has a central opening formed therein between the first end 134 of the tab portions 132 and the first end 142 of the bridge portions 140. In FIGS. 3A and 3B, the first electrode 106 has a central opening 146. However, it should be understood that the first electrode 106 does not need to include the central opening 146 when a central opening is provided within the second electrode 108, as shown in FIGS. 4A and 4B. Alternatively, the second electrode 108 does not need to include the central opening when the central opening 146 is provided within the first electrode 106. Referring still to FIGS. 1-4B, the first electrical insulator layer 111 and the second electrical insulator layer 112 have a geometry generally corresponding to the first electrode 106 and the second electrode 108, respectively. Thus, the first electrical insulator layer 111 and the second electrical insulator layer 112 each have tab portions 170, 172 and bridge portions 174, 176 corresponding to like portions on the first electrode 106 and the second electrode 108. Further, the first electrical insulator layer 111 and the second electrical insulator layer 112 each have an outer perimeter 178, 180 corresponding to the outer perimeter 138 of the first electrode 106 and the outer perimeter 160 of the second electrode 108, respectively, when positioned thereon.

It should be appreciated that, in some embodiments, the first electrical insulator layer 111 and the second electrical insulator layer 112 generally include the same structure and composition. As such, in some embodiments, the first electrical insulator layer 111 and the second electrical insulator layer 112 each include an adhesive surface 182, 184 and an opposite non-sealable surface 186, 188, respectively. Thus, in some embodiments, the first electrical insulator layer 111 and the second electrical insulator layer 112 are each a polymer tape adhered to the inner surface 128 of the first electrode 106 and the inner surface 150 of the second electrode 108, respectively.

Referring now to FIGS. 2-4B, the artificial muscle 100 is shown in its assembled form with the first terminal 130 of the first electrode 106 and the second terminal 152 of the second electrode 108 extending past an outer perimeter of the housing 110, i.e., the first film layer 122 and the second film layer 124. As shown in FIG. 2, the second electrode 108 is stacked on top of the first electrode 106 and, therefore, the first electrode 106, the first film layer 122, and the second film layer 124 are not shown. In its assembled form, the first electrode 106, the second electrode 108, the first electrical insulator layer 111, and the second electrical insulator layer 112 are sandwiched between the first film layer 122 and the second film layer 124. The first film layer 122 is partially sealed to the second film layer 124 at an area surrounding the outer perimeter 138 of the first electrode 106 and the outer perimeter 160 of the second electrode 108. In some embodiments, the first film layer 122 is heat-sealed to the second film layer 124. Specifically, in some embodiments, the first film layer 122 is sealed to the second film layer 124 to define a sealed portion 190 surrounding the first electrode 106 and the second electrode 108. The first film layer 122 and the second film layer 124 may be sealed in any suitable manner, such as using an adhesive, heat sealing, or the like.

The first electrode 106, the second electrode 108, the first electrical insulator layer 111, and the second electrical insulator layer 112 provide a barrier that prevents the first film layer 122 from sealing to the second film layer 124 forming an unsealed portion 192. The unsealed portion 192 of the housing 110 includes the electrode region 194, in which the electrode pair 104 is provided, and the expandable fluid region 196, which is surrounded by the electrode region 194. The central openings 146, 168 of the first electrode 106 and the second electrode 108 form the expandable fluid region 196 and are arranged to be axially stacked on one another. Although not shown, the housing 110 may be cut to conform to the geometry of the electrode pair 104 and reduce the size of the artificial muscle 100, namely, the size of the sealed portion 190.

A dielectric fluid 198 is provided within the unsealed portion 192 and flows freely between the first electrode 106 and the second electrode 108. A "dielectric" fluid as used herein is a medium or material that transmits electrical force without conduction and as such has low electrical conductivity. Some non-limiting example dielectric fluids include perfluoroalkanes, transformer oils, and deionized water. It should be appreciated that the dielectric fluid 198 may be injected into the unsealed portion 192 of the artificial muscle 100 using a needle or other suitable injection device.

Referring now to FIGS. 3A and 3B, the artificial muscle 100 is actuatable between a non-actuated state and an actuated state. In the non-actuated state, as shown in FIG. 3A, the first electrode 106 and the second electrode 108 are partially spaced apart from one another proximate the central openings 146, 168 thereof and the first end 134, 156 of the tab portions 132, 154. The second end 136, 158 of the tab portions 132, 154 remain in position relative to one another due to the housing 110 being sealed at the outer perimeter 138 of the first electrode 106 and the outer perimeter 160 of the second electrode 108. In the actuated state, as shown in FIG. 3B, the first electrode 106 and the second electrode 108 are brought into contact with and oriented parallel to one another to force the dielectric fluid 198 into the expandable fluid region 196. This causes the dielectric fluid 198 to flow through the central openings 146, 168 of the first electrode 106 and the second electrode 108 and inflate the expandable fluid region 196.

Referring now to FIG. 3A, the artificial muscle 100 is shown in the non-actuated state. The electrode pair 104 is provided within the electrode region 194 of the unsealed portion 192 of the housing 110. The central opening 146 of the first electrode 106 and the central opening 168 of the second electrode 108 are coaxially aligned within the expandable fluid region 196. In the non-actuated state, the first electrode 106 and the second electrode 108 are partially spaced apart from and non-parallel to one another. Due to the first film layer 122 being sealed to the second film layer 124 around the electrode pair 104, the second end 136, 158 of the tab portions 132, 154 are brought into contact with one another. Thus, dielectric fluid 198 is provided between the first electrode 106 and the second electrode 108, thereby separating the first end 134, 156 of the tab portions 132, 154 proximate the expandable fluid region 196. Stated another way, a distance between the first end 134 of the tab portion 132 of the first electrode 106 and the first end 156 of the tab portion 154 of the second electrode 108 is greater than a distance between the second end 136 of the tab portion 132 of the first electrode 106 and the second end 158 of the tab portion 154 of the second electrode 108. This results in the electrode pair 104 zippering toward the expandable fluid region 196 when actuated. In some embodiments, the first electrode 106 and the second electrode 108 may be flexible. Thus, as shown in FIG. 3A, the first electrode 106 and the second electrode 108 are convex such that the second ends 136, 158 of the tab portions 132, 154 thereof may remain close to one another, but spaced apart from one another proximate the central openings 146, 168. In the non-actuated state, the expandable fluid region 196 has a first height H1.

When actuated, as shown in FIG. 3B, the first electrode 106 and the second electrode 108 zipper toward one another from the second ends 144, 158 of the tab portions 132, 154 thereof, thereby pushing the dielectric fluid 198 into the expandable fluid region 196. As shown, when in the actuated state, the first electrode 106 and the second electrode 108 are parallel to one another. In the actuated state, the dielectric fluid 198 flows into the expandable fluid region 196 to inflate the expandable fluid region 196. As such, the first film layer 122 and the second film layer 124 expand in opposite directions. In the actuated state, the expandable fluid region 196 has a second height H2, which is greater than the first height H1 of the expandable fluid region 196 when in the non-actuated state. Although not shown, it should be noted that the electrode pair 104 may be partially actuated to a position between the non-actuated state and the actuated state. This would allow for partial inflation of the expandable fluid region 196 and adjustments when necessary.

In order to move the first electrode 106 and the second electrode 108 toward one another, a voltage is applied by a power supply (such as power supply 48 of FIG. 12). In some embodiments, a voltage of up to 10 kV may be provided from the power supply to induce an electric field through the dielectric fluid 198. The resulting attraction between the first electrode 106 and the second electrode 108 pushes the dielectric fluid 198 into the expandable fluid region 196. Pressure from the dielectric fluid 198 within the expandable fluid region 196 causes the first film layer 122 and the first electrical insulator layer 111 to deform in a first axial direction along the center axis C of the first electrode 106 and causes the second film layer 124 and the second electrical insulator layer 112 to deform in an opposite second axial direction along the center axis C of the second electrode 108. Once the voltage being supplied to the first electrode 106 and the second electrode 108 is discontinued, the first electrode 106 and the second electrode 108 return to their initial, non-parallel position in the non-actuated state. In operation, voltage may be applied to one or multiple artificial muscles 100 of the artificial muscle stacks and the layered actuation structure 500 (FIGS. 8A-10) to collectively and/or selectively actuate the artificial muscles 100 of the artificial muscle stacks and the layered actuation structure 500.

It should be appreciated that the present embodiments of the artificial muscle 100 disclosed herein, specifically, the tab portions 132, 154 with the interconnecting bridge portions 174, 176, provide a number of improvements over actuators that do not include the tab portions 132, 154, such as hydraulically amplified self-healing electrostatic (HASEL) actuators described in the paper titled "*Hydraulically amplified self-healing electrostatic actuators with muscle-like performance*" by E. Acome, S. K. Mitchell, T. G. Morrissey, M. B. Emmett, C. Benjamin, M. King, M. Radakovitz, and C. Keplinger (Science 5 Jan. 2018: Vol. 359, Issue 6371, pp. 61-65). Embodiments of the artificial muscle 100 including two pairs of tab portions 132, 154 on each of the first electrode 106 and the second electrode 108, respectively, reduces the overall mass and thickness of the artificial muscle 100, reduces the amount of voltage required during actuation, and decreases the total volume of the artificial muscle 100 without reducing the amount of resulting force after actuation as compared to known HASEL actuators including donut-shaped electrodes having a uniform, radially-extending width. More particularly, the tab portions 132, 154 of the artificial muscle 100 provide zipping fronts that result in increased actuation power by providing localized and uniform hydraulic actuation of the artificial muscle 100 compared to HASEL actuators including donut-shaped electrodes. Specifically, one pair of tab portions 132, 154 provides twice the amount of actuator power per unit volume as compared to donut-shaped HASEL actuators, while two pairs of tab portions 132, 154 provide four times the amount of actuator power per unit volume. The bridge portions 174, 176 interconnecting the tab portions 132, 154 also limit buckling of the tab portions 132, 154 by maintaining the distance between adjacent tab portions 132, 154 during actuation. Because the bridge portions 174, 176 are integrally formed with the tab portions 132, 154, the bridge portions 174, 176 also prevent leakage between the tab portions 132, 154 by eliminating attachment locations that provide an increased risk of rupturing.

In operation, when the artificial muscle 100 is actuated, expansion of the expandable fluid region 196 produces a force of 3 Newton-millimeters (N·mm) per cubic centimeter ($cm^3$ of actuator volume or greater, such as 4 N·mm per $cm^3$ or greater, 5 N·mm per $cm^3$ or greater, 6 N·mm per $cm^3$ or greater, 7 N·mm per $cm^3$ or greater, 8 N·mm per $cm^3$ or greater, or the like. In one example, when the artificial muscle 100 is actuated by a voltage of 9.5 kilovolts (kV), the artificial muscle 100 provides a resulting force of 5 N. In another example, when the artificial muscle 100 is actuated by a voltage of 10 kV the artificial muscle 100 provides 440% strain under a 500 gram load.

Moreover, the size of the first electrode 106 and the second electrode 108 is proportional to the amount of displacement of the dielectric fluid 198. Therefore, when greater displacement within the expandable fluid region 196 is desired, the size of the electrode pair 104 is increased relative to the size of the expandable fluid region 196. It should be appreciated that the size of the expandable fluid region 196 is defined by the central openings 146, 168 in the first electrode 106 and the second electrode 108. Thus, the degree of displacement within the expandable fluid region 196 may alternatively, or in addition, be controlled by increasing or reducing the size of the central openings 146, 168.

As shown in FIGS. 4A and 4B, another embodiment of an artificial muscle 100' is illustrated. The artificial muscle 100' is substantially similar to the artificial muscle 100. As such, like structure is indicated with like reference numerals. However, as shown, the first electrode 106 does not include a central opening. Thus, only the second electrode 108 includes the central opening 168 formed therein. As shown in FIG. 4A, the artificial muscle 100' is in the non-actuated state with the first electrode 106 being planar and the second electrode 108 being convex relative to the first electrode 106. In the non-actuated state, the expandable fluid region 196 has a first height H3. In the actuated state, as shown in FIG. 4B, the expandable fluid region 196 has a second height H4, which is greater than the first height H3. It should be appreciated that by providing the central opening 168 only in the second electrode 108 as opposed to both the first electrode 106 and the second electrode 108, the total deformation may be formed on one side of the artificial muscle 100'. In addition, because the total deformation is formed on only one side of the artificial muscle 100', the second height H4 of the expandable fluid region 196 of the artificial muscle 100' extends further from a longitudinal axis perpendicular to the central axis C of the artificial muscle 100' than the second height H2 of the expandable fluid region 196 of the artificial muscle 100 when all other dimensions, orientations, and volume of dielectric fluid are the same.

Figure 5:
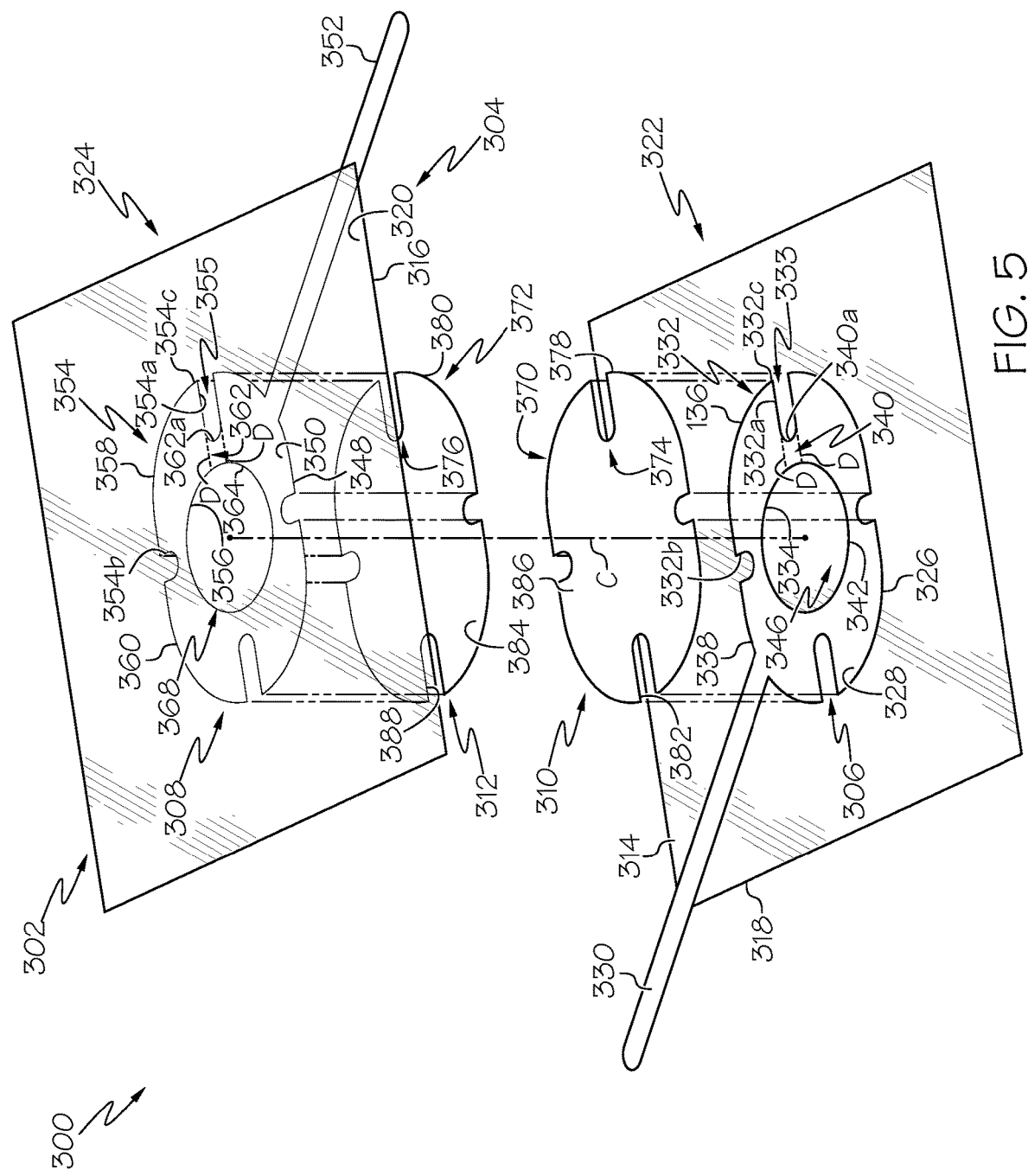
FIG. 5 schematically depicts an exploded view of another illustrative artificial muscle, according to one or more embodiments shown and described herein.
Figure 6:
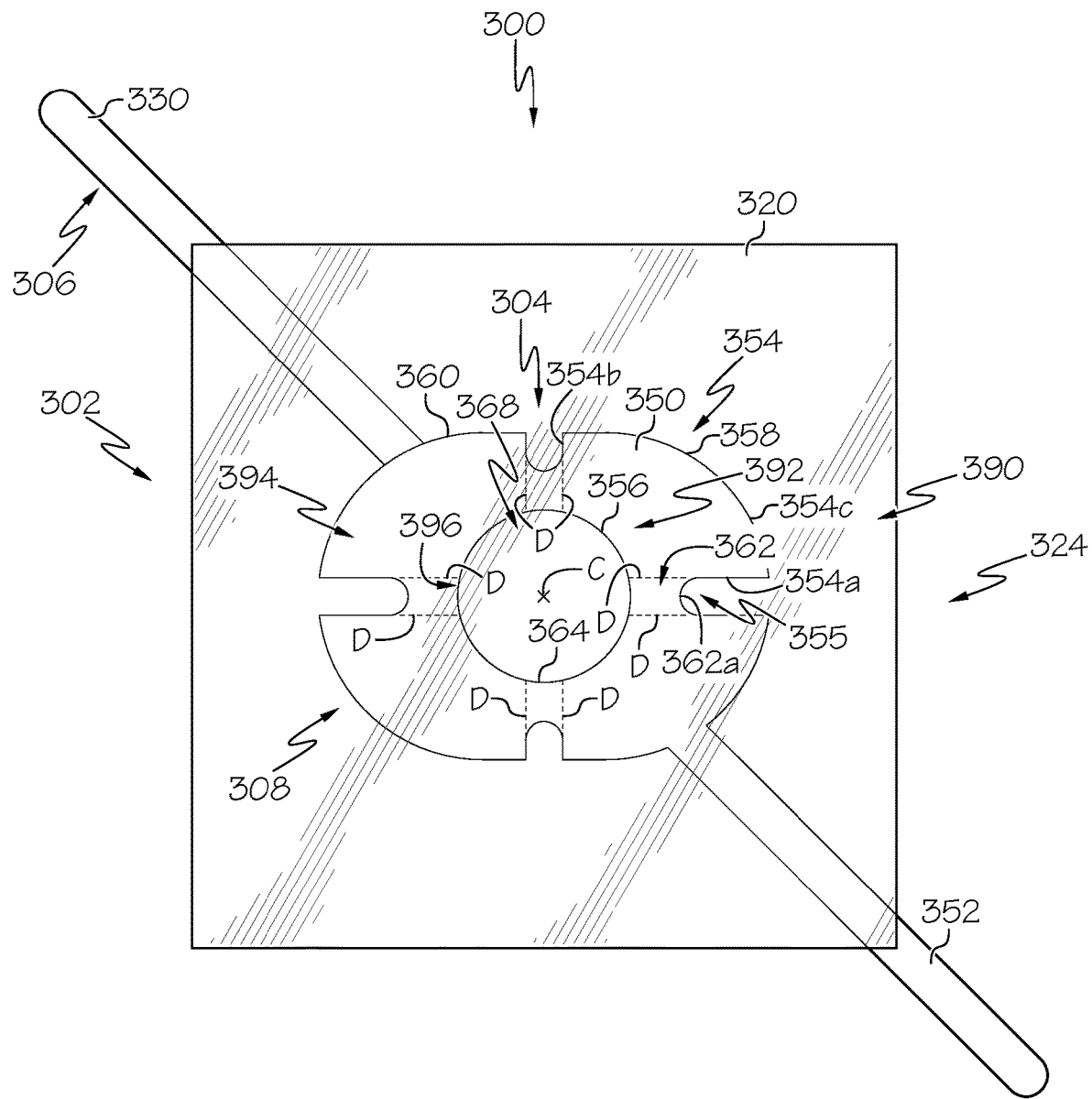
FIG. 6 schematically depicts a top view of the artificial muscle of FIG. 5, according to one or more embodiments shown and described herein.
Figure 7:
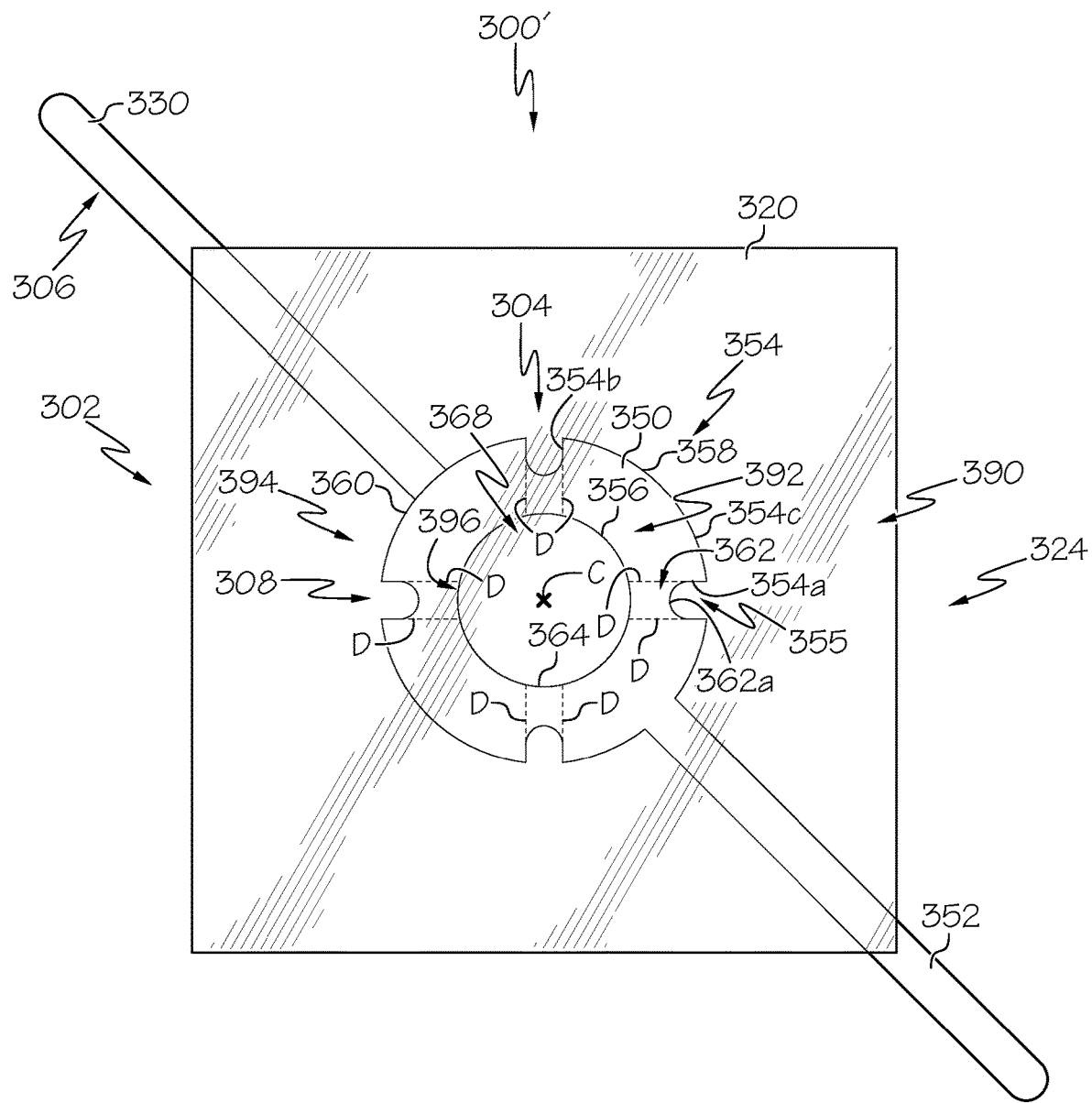
FIG. 7 schematically depicts a top view of another artificial muscle, according to one or more embodiments shown and described herein.

As shown in FIGS. 5-7, another embodiment of an artificial muscle 300 is illustrated. It should be appreciated that the artificial muscle 300 includes similar structure as the artificial muscle 100 (FIG. 1) and therefore operates similarly to the artificial muscle 100 (FIG. 1). Accordingly, the artificial muscle 300 described herein may be incorporated in the seat layered actuation structure 500 (FIGS. 8A-10) instead of, or in addition to, the previously described artificial muscles. Notably, the artificial muscle 300 includes fan portions 332 in place of the tab portions 132 (FIG. 1) discussed in relation to the artificial muscle 100 (FIG. 1). However, it should be understood that both the fan portions 332 of the artificial muscle 300 and the tab portions 132 are each generally a radially extending portion of an electrode of an artificial muscle, are positioned adjacent bridge portions, and provide a zipping functionality, as described above with respect to the artificial muscle 100 and 100', and below with respect to the artificial muscle 300. Indeed, these radially extending portions (e.g., tab portions and fan portions) each provide increased actuator power per unit volume, while minimizing buckling and rupture during operation.

Referring now to FIGS. 5 and 6, the artificial muscle 300 includes a housing 302, an electrode pair 304, including a first electrode 306 and a second electrode 308, fixed to opposite surfaces of the housing 302, a first electrical insulator layer 310 fixed to the first electrode 306, and a second electrical insulator layer 312 fixed to the second electrode 308. In some embodiments, the housing 302 is a one-piece monolithic layer including a pair of opposite inner surfaces, such as a first inner surface 314 and a second inner surface 316, and a pair of opposite outer surfaces, such as a first outer surface 318 and a second outer surface 320. In some embodiments, the first inner surface 314 and the second inner surface 316 of the housing 302 are heat-sealable. In other embodiments, the housing 302 may be a pair of individually fabricated film layers, such as a first film layer 322 and a second film layer 324. Thus, the first film layer 322 includes the first inner surface 314 and the first outer surface 318, and the second film layer 324 includes the second inner surface 316 and the second outer surface 320.

Throughout the ensuing description, reference may be made to the housing 302 including the first film layer 322 and the second film layer 324, as opposed to the one-piece housing. It should be understood that either arrangement is contemplated. In some embodiments, the first film layer 322 and the second film layer 324 generally include the same structure and composition. For example, in some embodiments, the first film layer 322 and the second film layer 324 each comprises biaxially oriented polypropylene.

The first electrode 306 and the second electrode 308 are each positioned between the first film layer 322 and the second film layer 324. In some embodiments, the first electrode 306 and the second electrode 308 are each aluminum-coated polyester such as, for example, Mylar®. In addition, one of the first electrode 306 and the second electrode 308 is a negatively charged electrode and the other of the first electrode 306 and the second electrode 308 is a positively charged electrode. For purposes discussed herein, either electrode 306, 308 may be positively charged so long as the other electrode 306, 308 of the artificial muscle 300 is negatively charged.

The first electrode 306 has a film-facing surface 326 and an opposite inner surface 328. The first electrode 306 is positioned against the first film layer 322, specifically, the first inner surface 314 of the first film layer 322. In addition, the first electrode 306 includes a first terminal 330 extending from the first electrode 306 past an edge of the first film layer 322 such that the first terminal 330 can be connected to a power supply to actuate the first electrode 306. Specifically, the terminal is coupled, either directly or in series, to a power supply and a controller of the actuation system 400 (FIG. 12). Similarly, the second electrode 308 has a film-facing surface 348 and an opposite inner surface 350. The second electrode 308 is positioned against the second film layer 324, specifically, the second inner surface 316 of the second film layer 324. The second electrode 308 includes a second terminal 352 extending from the second electrode 308 past an edge of the second film layer 324 such that the second terminal 352 can be connected to a power supply and a controller of the actuation system 400 (FIG. 12) to actuate the second electrode 308.

With respect now to the first electrode 306, the first electrode 306 includes two or more fan portions 332 extending radially from a center axis C of the artificial muscle 300. In some embodiments, the first electrode 306 includes only two fan portions 332 positioned on opposite sides or ends of the first electrode 306. In some embodiments, the first electrode 306 includes more than two fan portions 332, such as three, four, or five fan portions 332. In embodiments in which the first electrode 306 includes an even number of fan portions 332, the fan portions 332 may be arranged in two or more pairs of fan portions 332. As shown in FIG. 5, the first electrode 306 includes four fan portions 332. In this embodiment, the four fan portions 332 are arranged in two pairs of fan portions 332, where the two individual fan portions 332 of each pair are diametrically opposed to one another.

Each fan portion 332 has a first side edge 332a and an opposite second side edge 332b. As shown, the first terminal 330 extends from a second end 336 of one of the fan portions 332 and is integrally formed therewith. A channel 333 is at least partially defined by opposing side edges 332a, 332b of adjacent fan portions 332 and, thus, extends radially toward the center axis C. The channel 333 terminates at an end 340a of a bridge portion 340 interconnecting adjacent fan portions 332.

As shown in FIG. 5, dividing lines D are included to depict the boundary between the fan portions 332 and the bridge portions 340. The dividing lines D extend from the side edges 332a, 332b of the fan portions 332 to a first end 334 of the fan portions 332 collinear with the side edges 332a, 332b. It should be understood that dividing lines D are shown in FIG. 5 for clarity and that the fan portions 332 are integral with the bridge portions 340. The first end 334 of the fan portion 332, which extends between adjacent bridge portions 340, defines an inner length of the fan portion 332. Due to the geometry of the fan portion 332 tapering toward the center axis C between the first side edge 332a and the second side edge 332b, the second end 336 of the fan portion 332 defines an outer length of the fan portion 332 that is greater than the inner length of the fan portion 332.

Moreover, each fan portion 332 has a pair of corners 332c defined by an intersection of the second end 336 and each of the first side edge 332a and the second side edge 332b of the fan portion 332. In embodiments, the corners 332c are formed at an angle equal to or less than 90 degrees. In other embodiments, the corners 332c are formed at an acute angle.

As shown in FIG. 5, each fan portion 332 has a first side length defined by a distance between the first end 334 of the fan portion 332 and the second end 336 of the fan portion 332 along the first side edge 332a and the dividing line D that is collinear with the first side edge 332a. Each fan portion 332 also has a second side length defined by a distance between the first end 334 of the fan portion 332 and the second end 336 of the fan portion 332 along the second side edge 332b and the dividing line D that is collinear with the second side edge 332b. In embodiments, the first side length is greater than the second side length of the fan portion 332 such that the first electrode 306 has an ellipsoid geometry.

The second end 336, the first side edge 332a and the second side edge 332b of each fan portion 332, and the bridge portions 340 interconnecting the fan portions 332 define an outer perimeter 338 of the first electrode 306. In embodiments, a central opening 346 is formed within the first electrode 306 between the fan portions 332 and the bridge portions 340, and is coaxial with the center axis C. Each fan portion 332 has a fan length extending from a perimeter 342 of the central opening 346 to the second end 336 of the fan portion 332. Each bridge portion 340 has a bridge length extending from a perimeter 342 of the central opening 346 to the end 340a of the bridge portion 340, i.e., the channel 333. As shown, the bridge length of each of the bridge portions 340 is substantially equal to one another. Each channel 333 has a channel length defined by a distance between the end 340a of the bridge portion 340 and the second end of the fan portion 332. Due to the bridge length of each of the bridge portions 340 being substantially equal to one another and the first side length of the fan portions 332 being greater than the second side length of the fan portions 332, a first pair of opposite channels 333 has a channel length greater than a channel length of a second pair of opposite channels 333. As shown, a width of the channel 333 extending between opposing side edges 332a, 332b of adjacent fan portions 332 remains substantially constant due to opposing side edges 332a, 332b being substantially parallel to one another.

In embodiments, the central opening 346 has a radius of 2 centimeters (cm) to 5 cm. In embodiments, the central opening 346 has a radius of 3 cm to 4 cm. In embodiments, a total fan area of each of the fan portions 332 is equal to or greater than twice an area of the central opening 346. It should be appreciated that the ratio between the total fan area of the fan portions 332 and the area of the central opening 346 is directly related to a total amount of deflection of the first film layer 322 when the artificial muscle 300 is actuated. In embodiments, the bridge length is 20% to 50% of the fan length. In embodiments, the bridge length is 30% to 40% of the fan length. In embodiments in which the first electrode 306 does not include the central opening 346, the fan length and the bridge length may be measured from a perimeter of an imaginary circle coaxial with the center axis C.

Similar to the first electrode 306, the second electrode 308 includes two or more fan portions 354 extending radially from the center axis C of the artificial muscle 300. The second electrode 308 includes substantially the same structure as the first electrode 306 and, thus, includes the same number of fan portions 354. Specifically, the second electrode 308 is illustrated as including four fan portions 354. However, it should be appreciated that the second electrode 308 may include any suitable number of fan portions 354.

Each fan portion 354 of the second electrode 308 has a first side edge 354a and an opposite second side edge 354b. As shown, the second terminal 352 extends from a second end 358 of one of the fan portions 354 and is integrally formed therewith. A channel 355 is at least partially defined by opposing side edges 354a, 354b of adjacent fan portions 354 and, thus, extends radially toward the center axis C. The channel 355 terminates at an end 362a of a bridge portion 362 interconnecting adjacent fan portions 354.

As shown in FIG. 5, additional dividing lines D are included to depict the boundary between the fan portions 354 and the bridge portions 362. The dividing lines D extend from the side edges 354a, 354b of the fan portions 354 to the first end 356 of the fan portions 354 collinear with the side edges 354a, 354b. It should be understood that dividing lines D are shown in FIG. 5 for clarity and that the fan portions 354 are integral with the bridge portions 362. The first end 356 of the fan portion 354, which extends between adjacent bridge portions 362, defines an inner length of the fan portion 354. Due to the geometry of the fan portion 354 tapering toward the center axis C between the first side edge 354a and the second side edge 354b, the second end 358 of the fan portion 354 defines an outer length of the fan portion 354 that is greater than the inner length of the fan portion 354.

Moreover, each fan portion 354 has a pair of corners 354c defined by an intersection of the second end 358 and each of the first side edge 354a and the second side edge 354b of the fan portion 354. In embodiments, the corners 354c are formed at an angle equal to or less than 90 degrees. In other embodiments, the corners 354c are formed at an acute angle. As described in more detail herein, during actuation of the artificial muscle 300, the corners 332c of the first electrode 306 and the corners 354c of the second electrode 308 are configured to be attracted to one another at a lower voltage as compared to the rest of the first electrode 306 and the second electrode 308. Thus, actuation of the artificial muscle 300 initially at the corners 332c, 354c results in the outer perimeter 338 of the first electrode 306 and the outer perimeter 360 of the second electrode 308 being attracted to one another at a lower voltage and reducing the likelihood of air pockets or voids forming between the first electrode 306 and the second electrode 308 after actuation of the artificial muscle 300.

As shown in FIGS. 5 and 6, in embodiments, the first side edge 354a of each fan portion 354 has a first side length defined by a distance between the first end 356 of the fan portion 354 and the second end 358 of the fan portion 354 along the first side edge 354a and the dividing line D that is collinear with the first side edge 354a. Each fan portion 354 also has a second side length defined by a distance between the first end 356 of the fan portion 354 and the second end 358 of the fan portion 354 along the second side edge 354b and the dividing line D that is collinear with the second side edge 354b. In embodiments, the first side length is greater than the second side length of the fan portion 354 such that the second electrode 308 has an ellipsoid geometry corresponding to the geometry of the first electrode 306.

The second end 358, the first side edge 354a and the second side edge 354b of each fan portion 354, and the bridge portions 362 interconnecting the fan portions 354 define an outer perimeter 360 of the second electrode 308. In embodiments, a central opening 368 is formed within the second electrode 308 between the fan portions 354 and the bridge portions 362, and is coaxial with the center axis C. Each fan portion 354 has a fan length extending from a perimeter 364 of the central opening 368 to the second end 358 of the fan portion 354. Each bridge portion 362 has a bridge length extending from the central opening 368 to the end 362a of the bridge portion 362, i.e., the channel 355. As shown, the bridge length of each of the bridge portions 362 is substantially equal to one another. Each channel 355 has a channel length defined by a distance between the end 362a of the bridge portion 362 and the second end of the fan portion 354. Due to the bridge length of each of the bridge portions 362 being substantially equal to one another and the first side length of the fan portions 354 being greater than the second side length of the fan portions 354, a first pair of opposite channels 355 has a channel length greater than a channel length of a second pair of opposite channels 355. As shown, a width of the channel 355 extending between opposing side edges 354a, 354b of adjacent fan portions 354 remains substantially constant due to opposing side edges 354a, 354b being substantially parallel to one another.

In embodiments, the central opening 368 has a radius of 2 cm to 5 cm. In embodiments, the central opening 368 has a radius of 3 cm to 4 cm. In embodiments, a total fan area of each of the fan portions 354 is equal to or greater than twice an area of the central opening 368. It should be appreciated that the ratio between the total fan area of the fan portions 354 and the area of the central opening 368 is directly related to a total amount of deflection of the second film layer 324 when the artificial muscle 300 is actuated. In embodiments, the bridge length is 20% to 50% of the fan length. In embodiments, the bridge length is 30% to 40% of the fan length. In embodiments in which the second electrode 308 does not include the central opening 368, the fan length and the bridge length may be measured from a perimeter of an imaginary circle coaxial with the center axis C.

As described herein, the first electrode 306 and the second electrode 308 each have a central opening 346, 368 coaxial with the center axis C. However, it should be understood that the first electrode 306 does not need to include the central opening 346 when the central opening 368 is provided within the second electrode 308. Alternatively, the second electrode 308 does not need to include the central opening 368 when the central opening 346 is provided within the first electrode 306.

Referring again to FIG. 5, the first electrical insulator layer 310 and the second electrical insulator layer 312 have a substantially ellipsoid geometry generally corresponding to the geometry of the first electrode 306 and the second electrode 308, respectively. Thus, the first electrical insulator layer 310 and the second electrical insulator layer 312 each have fan portions 370, 372 and bridge portions 374, 376 corresponding to like portions on the first electrode 306 and the second electrode 308. Further, the first electrical insulator layer 310 and the second electrical insulator layer 312 each have an outer perimeter 378, 380 corresponding to the outer perimeter 338 of the first electrode 306 and the outer perimeter 360 of the second electrode 308, respectively, when positioned thereon.

It should be appreciated that, in some embodiments, the first electrical insulator layer 310 and the second electrical insulator layer 312 generally include the same structure and composition. As such, in some embodiments, the first electrical insulator layer 310 and the second electrical insulator layer 312 each include an adhesive surface 382, 384 and an opposite non-sealable surface 386, 388, respectively. Thus, in some embodiments, the first electrical insulator layer 310 and the second electrical insulator layer 312 are each a polymer tape adhered to the inner surface 328 of the first electrode 306 and the inner surface 350 of the second electrode 308, respectively.

Referring now to FIG. 6, the artificial muscle 300 is shown in its assembled form with the first terminal 330 of the first electrode 306 and the second terminal 352 of the second electrode 308 extending past an outer perimeter of the housing 302, i.e., the first film layer 322 (FIG. 5) and the second film layer 324. The second electrode 308 is stacked on top of the first electrode 306 and, therefore, the first film layer 322 (FIG. 5) is not shown. In its assembled form, the first electrode 306, the second electrode 308, the first electrical insulator layer 310 (FIG. 5), and the second electrical insulator layer 312 (FIG. 5) are sandwiched between the first film layer 322 (FIG. 5) and the second film layer 324. The first film layer 322 (FIG. 5) is partially sealed to the second film layer 324 at an area surrounding the outer perimeter 338 (FIG. 5) of the first electrode 306 and the outer perimeter 360 of the second electrode 308. In some embodiments, the first film layer 322 (FIG. 5) is heat-sealed to the second film layer 324 (FIG. 5). Specifically, in some embodiments, the first film layer 322 (FIG. 5) is sealed to the second film layer 324 to define a sealed portion 390 surrounding the first electrode 306 and the second electrode 308. The first film layer 322 (FIG. 5) and the second film layer 324 may be sealed in any suitable manner, such as using an adhesive, heat sealing, vacuum sealing, or the like.

The first electrode 306, the second electrode 308, the first electrical insulator layer 310 (FIG. 5), and the second electrical insulator layer 312 (FIG. 5) provide a barrier that prevents the first film layer 322 (FIG. 5) from sealing to the second film layer 324, forming an unsealed portion 392. The unsealed portion 392 of the housing 302 includes an electrode region 394, in which the electrode pair 304 is provided, and an expandable fluid region 396, which is surrounded by the electrode region 394. The central openings 346 (FIG. 5), 368 of the first electrode 306 and the second electrode 308 define the expandable fluid region 396 and are arranged to be axially stacked on one another. Although not shown, the housing 302 may be cut to conform to the geometry of the electrode pair 304 and reduce the size of the artificial muscle 300, namely, the size of the sealed portion 390. A dielectric fluid is provided within the unsealed portion 392 and flows freely between the first electrode 306 and the second electrode 308

Referring now to FIG. 7, an alternative embodiment of an artificial muscle 300' is illustrated. It should be appreciated that the artificial muscle 300' is similar to the artificial muscle 300 described herein. As such, like structure is indicated with like reference numerals. The first electrode 306 and the second electrode 308 of the artificial muscle 300' have a circular geometry as opposed to the ellipsoid geometry of the first electrode 306 and the second electrode 308 of the artificial muscle 300 described herein. As shown in FIG. 7, with respect to the second electrode 308, a first side edge length of the first side edge 354*a* is equal to a second side edge length of the second side edge 354*b*. Accordingly, the channels 355 formed between opposing side edges 354*a*, 354*b* of the fan portions 354 each have an equal length. Although the first electrode 306 is hidden from view in FIG. 7 by the second electrode 308, it should be appreciated that the first electrode 306 also has a circular geometry corresponding to the geometry of the second electrode 308.

Referring now to FIGS. 5 and 6, actuation of the artificial muscle 300 will be discussed. In the non-actuated state, the first electrode 306 and the second electrode 308 are partially spaced apart from one another proximate the central openings 346, 368 thereof and the first end 334, 356 of the fan portions 332, 354. The second end 336, 358 of the fan portions 332, 354 remain in position relative to one another due to the housing 302 being sealed at the outer perimeter 338 of the first electrode 306 and the outer perimeter 360 of the second electrode 308. In the actuated state, the first electrode 306 and the second electrode 308 are brought into contact with and oriented parallel to one another to force the dielectric fluid 398 into the expandable fluid region 396. This causes the dielectric fluid 398 to flow through the central openings 346, 368 of the first electrode 306 and the second electrode 308 and inflate the expandable fluid region 396.

In the non-actuated state, a distance between the first end 334 of the fan portion 332 of the first electrode 306 and the first end 356 of the fan portion 354 of the second electrode 308 is greater than a distance between the second end 336 of the fan portion 332 of the first electrode 306 and the second end 358 of the fan portion 354 of the second electrode 308. This results in the electrode pair 304 zippering toward the expandable fluid region 396 when actuated. When actuated, the first electrode 306 and the second electrode 308 zipper toward one another from the second ends 336, 358 of the fan portions 332, 354 thereof, thereby pushing the dielectric fluid 398 into the expandable fluid region 396. When in the actuated state, the first electrode 306 and the second electrode 308 are parallel to one another. In the actuated state, the dielectric fluid 398 flows into the expandable fluid region 396 to inflate the expandable fluid region 396. As such, the first film layer 322 and the second film layer 324 expand in opposite directions.

Figure 8A:
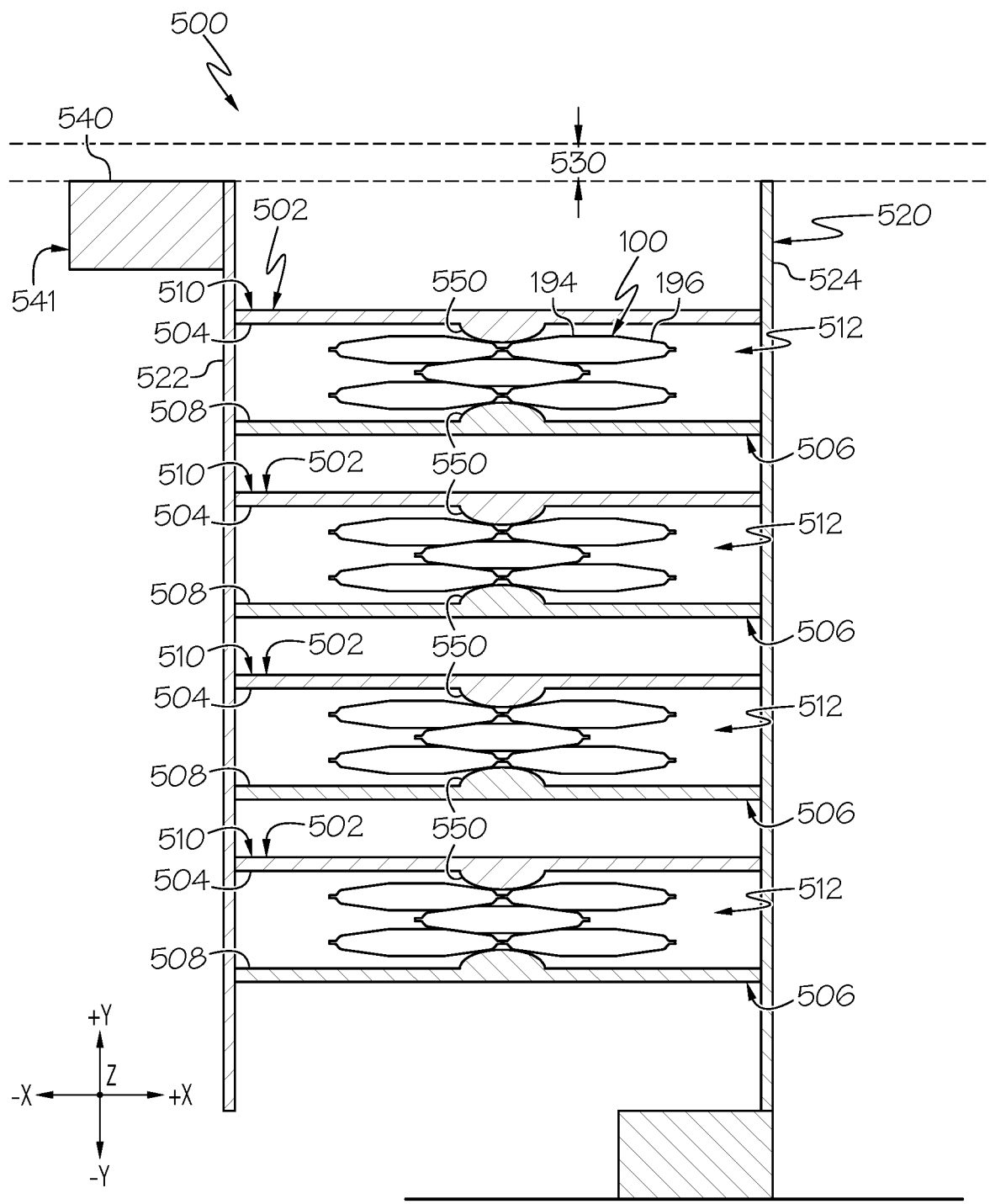
FIG. 8A schematically depicts a cross section of layered actuation structure comprising artificial muscles in a non-actuated state, according to one or more embodiments shown and described herein.
Figure 8B:
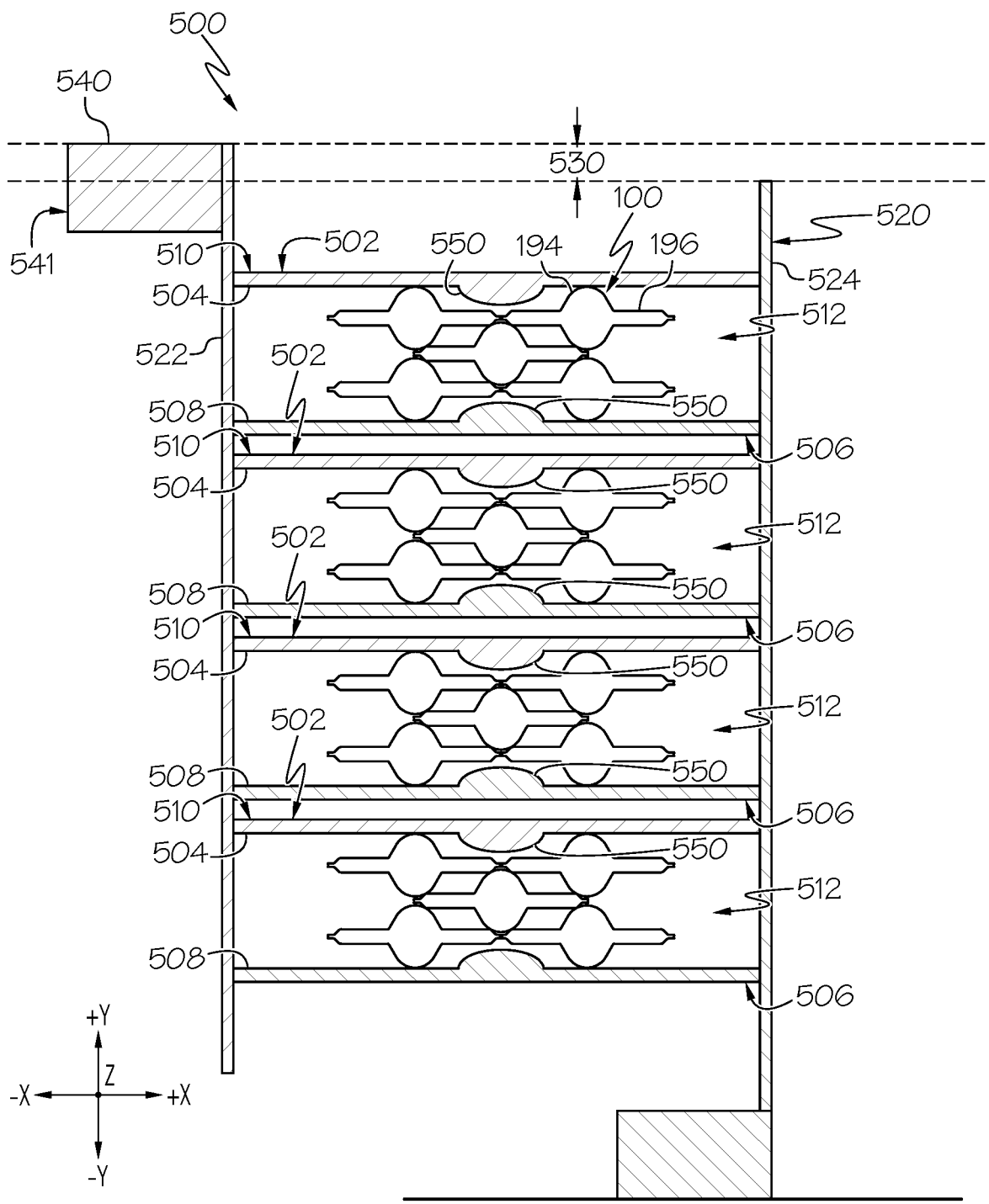
FIG. 8B schematically depicted the layered actuation structure of FIG. 8A in which the artificial muscles are in an actuated state, according to one or more embodiments shown and described herein.

Referring now to FIGS. 8A and 8B, the layered actuation structure 500 is schematically depicted. FIG. 8A schematically depicts the layered actuation structure 500 in a non-actuated state. FIG. 8B schematically depicts the layered actuation structure 500 in an actuated state. The layered actuation structure 500 includes one or more actuation platforms 502 interleaved with one or more mounting platforms 506 to form one or more platform pairs 510. Each platform pair 510 includes a mounting platform 506 and actuation platform 502 forming an actuation cavity 512 therebetween. The one or more actuation platforms 502 each comprise a cavity facing surface 504. Similarly, the one or more mounting platforms 506 each comprise a cavity-facing surface 508. In each platform pair 510, the cavity-facing surface 504 of the individual actuation platform 502 faces the cavity-facing surface 508 of the individual mounting platform 506. In some embodiments, the actuation platforms 502 and the mounting platforms 506 each comprise a thickness of from ¼ inch to ¹⁄₃₂ inch, for example, ¼ inch, ⅛ inch, ¹⁄₁₀ inch, ¹⁄₁₂ inch, ¹⁄₁₆ inch, ¹⁄₂₀ inch, ¹⁄₂₄ inch, ¹⁄₂₈ inch, ¹⁄₃₂ inch, or any range having any two of these values as endpoints.

Referring still to FIGS. 8A and 8B, each of the platform pairs 510 is spaced from at least one adjacent one of the platform pairs 510 by at least a cavity displacement distance 530 to provide clearance for the one or more actuation platforms 502 to move relative to the one or more mounting platforms 506 in a movement direction (e.g., the Y-direction depicted in FIGS. 8A and 8B). Moreover, one or more artificial muscles 100, 100', 300, 300' are disposed in each of the actuation cavities 512 such that actuation of the one or more artificial muscles 100, 100', 300, 300' that is, expansion of the expandable fluid region 196, 396, applies pressure to the one or more actuation platforms 502, generating translational motion of the one or more actuation platforms 502. While the artificial muscles 100 are depicted in FIGS. 8A and 8B, it should be understood that the layered actuation structure 500 may include any embodiment of an artificial muscle 100, 100', 300, 300' described herein. In some embodiments, a single artificial muscle 100, 100', 300, 300' is disposed in some or all of the actuation cavities 512. In other embodiments, a plurality of artificial muscles 100, 100', 300, 300' are disposed in some or all of the actuation cavities 512. Moreover, when a plurality of artificial muscles 100, 100', 300, 300' are disposed in an actuation cavity, the plurality of artificial muscles 100, 100', 300, 300' may be disposed in an artificial muscle stack comprising a plurality of artificial muscles layers arranged in an alternating offset arrangement. In an alternating offset arrangement a plurality of artificial muscle layers are arranged such that each expandable fluid region 196, 396 of the housing 110, 302 of the one or more artificial muscles 100, 100', 300, 300' of each artificial muscle layer overlaps at least one radially extending portion 132, 154, 332, 354 of one or more artificial muscles 100, 100', 300, 300' of an adjacent artificial muscle layer. In other words, each expandable fluid region 196, 396 of the housing 110, 302 of the one or more artificial muscles 100, 100', 300, 300' of each artificial muscle layer overlaps the electrode region 194, 394 of the housing 110, 302 of one or more artificial muscles 100, 100', 300, 300' of an adjacent artificial muscle layer. In other embodiments, the plurality of artificial muscles may be disposed in an artificial muscle stack comprising a plurality of artificial muscle layers arranged in a coaxial arrangement. In a coaxial arrangement, the expandable fluid regions 196, 396 of each individual artificial muscle 100, 100', 300, 300' of an individual artificial muscle layer is in coaxial alignment with an individual artificial muscle 100, 100', 300, 300' of each of the other individual artificial muscle layers. It should be appreciated that the artificial muscles 100, 100', 300, 300' may be arranged in the actuation cavities 512 in any other desirable arrangement.

In some embodiments, as shown in FIGS. 8A and 8B, the one or more actuation platforms 502 and the one or more mounting platforms 506 each comprise one or more bumps 550 extending into the one or more actuation cavities 512. In particular, the bumps 550 extend outward from the cavity-facing surface 504 of the actuation platforms 502 and the cavity-facing surface 508 of the mounting platforms 506. The one or more bumps 550 are sized and positioned to overlap with the electrode region 194, 394 of at least one of the one or more artificial muscles 100, 100', 300, 300' arranged in the actuation cavities 512. In operation, when the expandable fluid regions 196, 396 of the artificial muscles 100, 100', 300, 300' expand and press against the cavity-facing surfaces 504, 508 of the actuation platform 502 and the mounting platform 506, the contracted electrode regions 194, 394 press against the bump 550. In some embodiments, the bumps 550 are arranged to correspond with the alternating offset arrangement of the artificial muscle stack. That is, the one or more bumps 550 are positioned such that an individual bump 550 aligns with at least one radially extending portion 132, 154, 332, 354 which is positioned in the electrode region 194, 394 of at least one artificial muscle 100, 100', 300, 300'.

Figure 9:
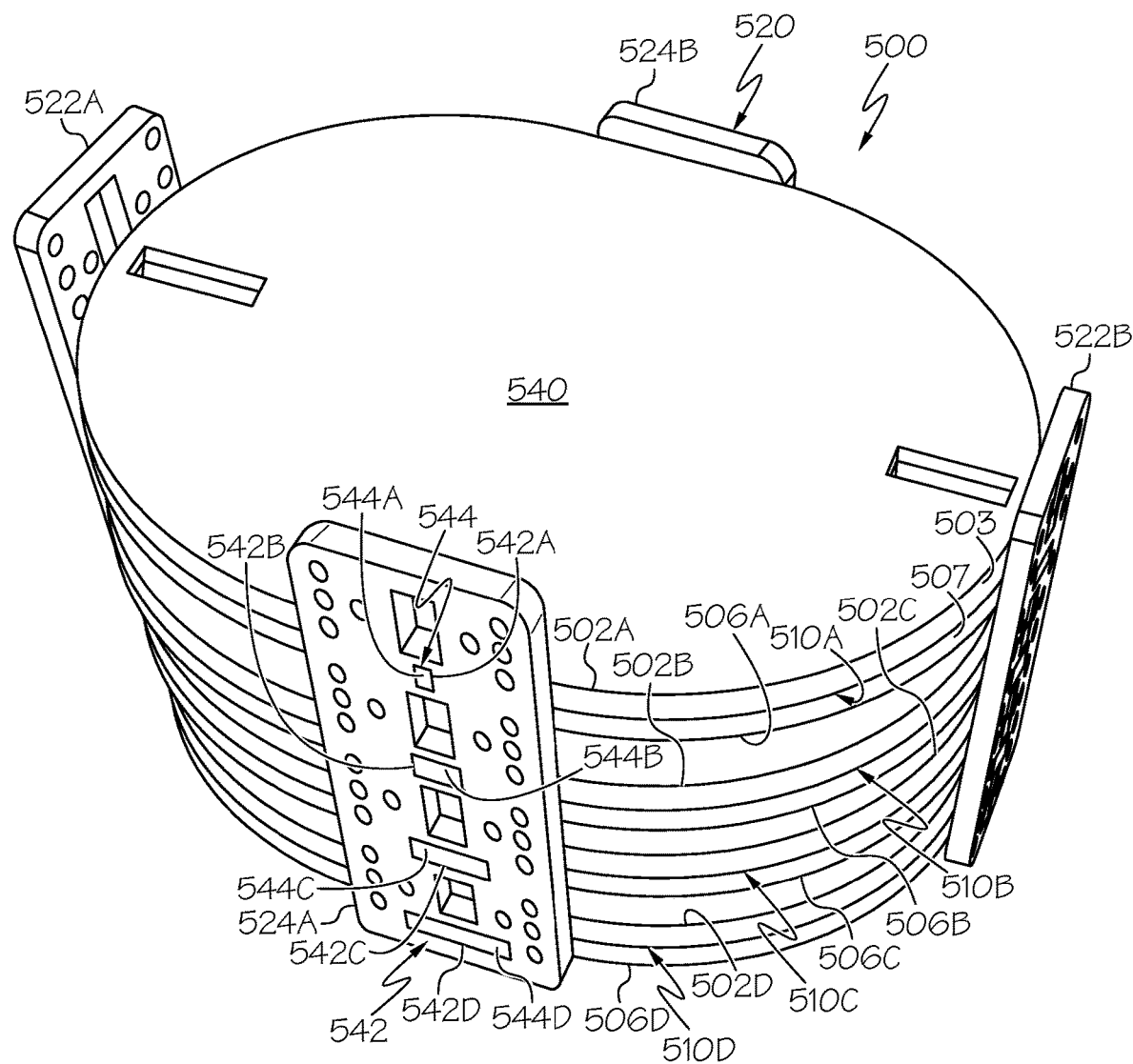
FIG. 9 schematically depicts an example layered actuation structure, according to one or more embodiments shown and described herein.
Figure 10:
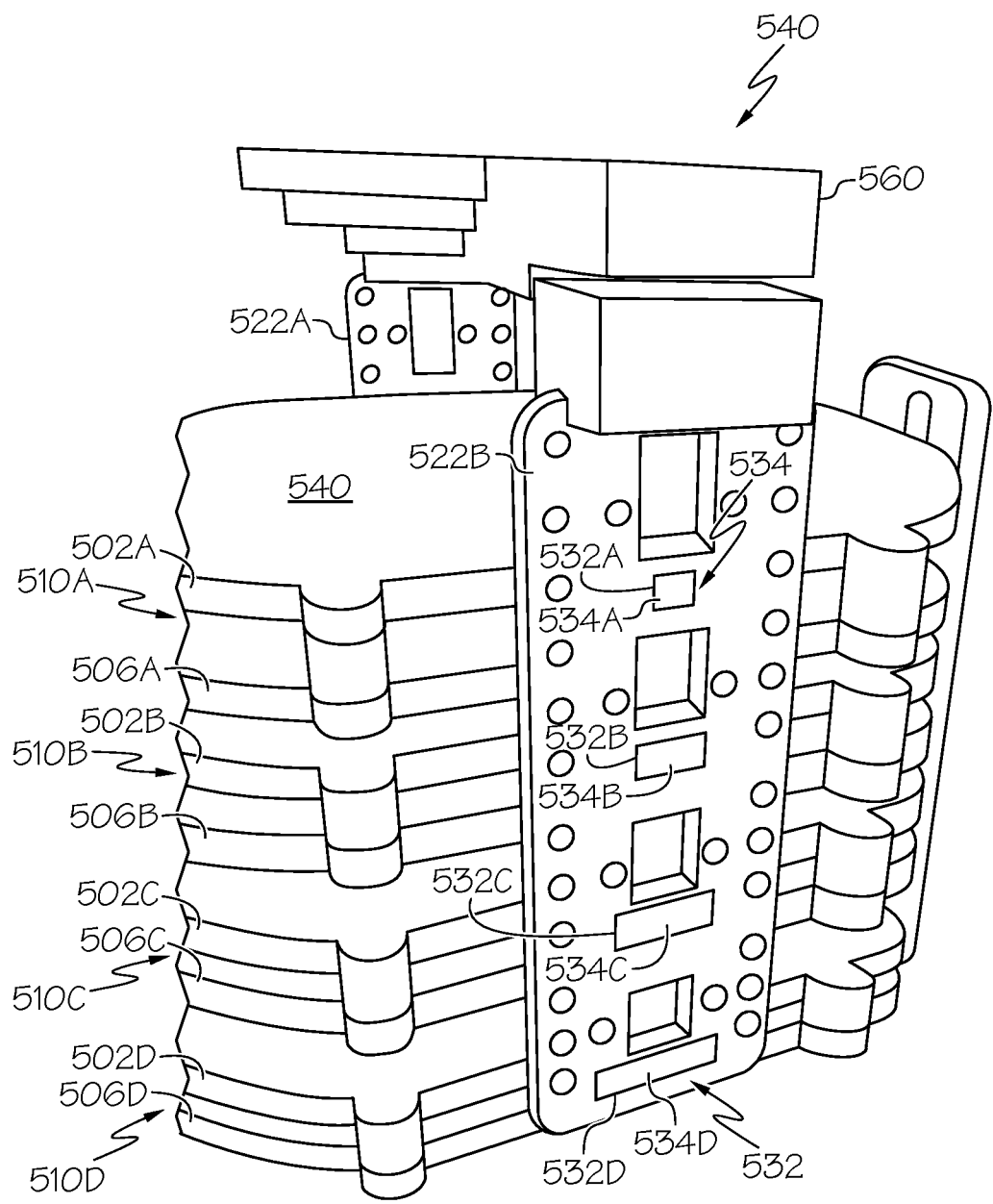
FIG. 10 schematically depicts the example layered actuation structure of FIG. 9 including a weight bar, according to one or more embodiments shown and described herein.

Referring also to FIGS. 9 and 10, the layered actuation structure 500 further includes one or more platform linking arms 520 that connect the platform pairs 510 to one another. The platform linking arms 520 retain the lateral positioning of platform pairs 510 (i.e., positioning in the X and Z directions), retain the spacing between the mounting platforms 506 of adjacent platform pairs 510 in the movement direction (i.e., in the Y direction) and allow for translational motion of the actuation platforms 502 of each platform pair 510 in the movement direction. As shown in FIGS. 8A-10, the one or more platform linking arms 520 comprise a plurality of platform linking arms 520 that include at least one actuation arm 522 coupled to the one or more actuation platforms 502 and at least one support arm 524 coupled to the one or more mounting platforms 506. In particular, the actuation arm 522 is rigidly coupled to each actuation platform 502 and translatably coupled to each mounting platform 506, and the support arm 524 is rigidly coupled to each mounting platform 506 and translatably coupled to each actuation platform 502.

As shown in FIGS. 9 and 10, in some embodiments, the layered actuation structure 500 comprises multiple support arms 524 and multiple actuation arms 522. For example, the layered actuation structure 500 may comprise a first actuation arm 522A, a second actuation arm 522B, a first support arm 524A, and a second support arm 524B. The first and second actuation arms 522A, 522B may each be coupled to the one or more actuation platforms 502 and the first and second support arms 524A, 524B may each be coupled to the one or more mounting platforms 506. The first support arm 524A and the second support arm 524B may be coupled to the one or more mounting platforms 506 at opposite locations along an edge 507 of the one or more mounting platforms 506. The first actuation arm 522A and the second actuation arm 522B may be coupled to the one or more actuation platforms 502 at opposite locations along an edge 503 of the one or more actuation platforms 502. Furthermore, the first and second support arms 524A, 524B may be positioned relative the first and second actuation arms 522A, 522B such that an axis extending between the first support arm 524A and the second support arm 524B is orthogonal an axis extending between the first actuation arm 522A and the second actuation arm 522B

The connections between the one or more platform linking arms 520 and the platform pairs 510 will now be described in detail herein with reference to FIGS. 9 and 10. In embodiments, the one or more platform linking arms 520 include one or more engaging slots that allow for coupling between the platform linking arms 520 and a platform pair 510. For instance, and with reference to FIG. 10, the actuation arms 522 may include one or more engaging slots 532. That is, the actuation arm 522B may include the engaging slots 532A, 532B, 532C, and 532D. Each of the engaging slots 532A, 532B, 532C, and 532D may allow for coupling of an actuation platform 502 to the actuation arm 522B. For instance, the engaging slot 532A allows for coupling of an actuation platform 502A to the actuation arm 522B, the engaging slot 532B allows for coupling of an actuation platform 502B to the actuation arm 522B, the engaging slot 532C allows for coupling of an actuation platform 502C to the actuation arm 522B, and the engaging slot 532D allows for coupling of an actuation platform 502D to the actuation arm 522B. In embodiments, each actuation platform 502 of each platform pair 510 may be coupled to the actuation arm 522B at an engaging slot 532. Similarly, each actuation platform 502 of each platform pair 510 may be coupled to the actuations arm 522A at engaging slots of the actuation arm 522A.

The actuations platforms 502 couple to the actuation arms 522 via one or more connecting ledges 534. The connecting ledges 534 may be integral with the actuation platforms 502. In other embodiments, the connecting ledges 534 may be removably coupled to the actuation platforms 502. For instance, an actuation platform 502 may include a notch or partial bore along its edge 503 to receive a peg or other protrusion of a connecting ledge 534. In some embodiments an actuation platform 502 may include a threaded bore along its edge 503 to receive a screw or other threaded connector extending from a connecting ledge 534. In some embodiments, an actuation platform 502 may include a notch in its edge 503 to receive a protrusion of a connecting ledge 534 by snap-fit means. And in some embodiments, an actuation platform 502 may include a cut-out in its edge 503 to receive a protrusion of a connecting ledge 534 by friction-fit means. It should be appreciated that each actuation platform 502 of the layered actuation structure 500 need not be identical in connection means to a corresponding connecting ledge 534.

For instance, the actuation platform 502A may be integral with its corresponding connecting ledge 534A, and the actuation platform 502B may be snap-fit to its corresponding connecting ledge 534B. While embodiments have been described where the actuation platforms 502 include female connectors to receive a male connector of the connecting ledges 534, it should be appreciated that this is a non-limiting example, and in embodiments the connecting ledges 534 may include female connectors to receive male connectors of the actuation platforms 502. For instance, the connecting ledge 534A may include a threaded bore along its perimeter to receive a screw or other threaded connector extending from the actuation platform 502A. In embodiments where the actuation platforms 502 include a plurality of connecting ledges 534, for coupling to a plurality of actuation arms 522, for instance, an actuation platform 502 may include a plurality of connecting ledges 534 that connect to the actuation platform 502 by similar connecting means. For example, the connecting ledge 534A may be integral with the actuation platform 502A and a second connecting ledge of the actuation platform 502A may also be integral with the actuation platform 502A. In some embodiments, an actuation platform 502 may include a plurality of connecting ledges 534 that connect to the actuation platform 502 by dissimilar connecting means. For example, the connecting ledge 534A may be integral with the actuation platform 502A and a second connecting ledge of the actuation platform 502A may be coupled to the actuation platform 502A by snap-fit means.

The engaging slots 532 may take any desirable shape. For example, the engaging slots 532 may have cross sections that are rectangular, trapezoidal, elliptical, or the like. Similarly, the engaging slots 532 may take any desirable size or dimensions. The shape and size of the engaging slots 532 generally correspond the shape and size of a corresponding connecting ledge 534. That is, each engaging slot 532 is shaped and sized to receive at least one connecting ledge 534.

In embodiments, each actuation platform 502 of the layered actuation structure 500 includes the same number of connecting ledges 534 for connecting to one or more actuation arms 522. For instance, the actuation platforms 502A-D may each include two connecting ledges 534 for connecting to the actuation arms 522A and 522B. In some embodiments where each actuation platform 502 of the layered actuation structure 500 includes the same number of connecting ledges 534, the actuation platforms 502 may connect to the same actuation arm 522 with an equal number of connecting ledges 534. In other embodiments, however, the actuation platforms 502 may connect to a single actuation arm 522 with an unequal number of connecting ledges 534. For instance, each actuation platform 502A-D may include a single connecting ledge 534, the connecting ledge 534A of the actuation platform 502A may connect to the actuation arm 522B, and the connecting ledge 534B of the actuation platform 502B may connect to the actuation arm 522A. In such an example, the actuation platform 502A may not connect to the actuation arm 522A, and the actuation platform 502B may not connect to the actuation arm 522B.

In other embodiments, each actuation platform 502 of the layered actuation structure 500 does not include the same number of connecting ledges 534 for connecting to the actuation arms 522. In such embodiments, the actuation platforms 502 may each connect to the same actuation arms 522. For instance, the actuation platform 502A may connect to each of the actuation arms 522A and 522B with a single connecting ledge 534, and the actuation platform 502B may connect to each of the actuation arms 522A and 522B with a pair of connecting ledges 534. That is, the actuation platform 502B may connect to the actuation arm 522A with two connecting ledges 534 and connect to the actuation arm 522B with two connecting ledges 534. In other embodiments, the actuation platforms 502 may not each connect to the same actuation arms 522. For instance, the actuation platform 502A may connect to the actuation arm 522B with a single connecting ledge 534, and the actuation platform 502B may connect to the actuation arm 522A with two connecting ledges 534.

In embodiments, a single engaging slot 532 of the actuations arms 522 may receive a single connecting ledge 534. Therefore, in embodiments where a single actuation platform 502 connects to a single actuation arm 522 with more than one connecting ledge 534, the actuation arm 522 must include more than one engaging slot 532 for connecting to the actuation platform 502. For instance, the actuation arm 522B may include two engaging slots 532 for connecting to the actuation platform 502A. Therefore, the actuation arm 522B includes the engaging slot 532A for accepting the connecting ledge 534A of the actuation platform 502A and a second engaging slot positioned along the actuation arm 522B for accepting a second connecting ledge of the actuation platform 502A. Therefore, the second engaging slot may be vertically positioned along the actuation arm 522B to align with the actuation platform 502A. For example, the second engaging slot may be positioned substantially side-by-side with the engaging slot 532A. In other embodiments, a single engaging slot 532 of the actuation arms 522 may receive a plurality of connecting ledges 534. Therefore, in embodiments where a single actuation platform 502 connects to a single actuation arm 522 with more than one connecting ledge 534, the actuation arm 522 may include a single engaging slot 532 vertically positioned along the actuation arm 522 for interacting with said actuation platform 502. For instance, the engaging slot 532A may be sized to accept two connecting ledges 534 extending from the actuation platform 502A.

The above description relating to the coupling of the actuation platforms 502 to the actuation arms 522 by means of interaction between connecting ledges 534 of the actuation platforms 502 and engaging slots 532 of the actuation arms 522, may similarly apply to the coupling of the mounting platforms 506 to the one or more support arms 524 of the layered actuation structure 500. For instance, and with reference to FIG. 9, the support arms 524 may include one or more engaging slots 542. That is, the support arm 524A may include the engaging slots 542A, 542B, 542C, and 542D. Each of the engaging slots 542A, 542B, 542C, and 542D may allow for coupling of a mounting platform 506 to the support arm 524A. For instance, the engaging slot 542A allows for coupling of a mounting platform 506A to the support arm 524A, the engaging slot 542B allows for coupling of a mounting platform 506B to the support arm 524A, the engaging slot 542C allows for coupling of a mounting platform 506C to the support arm 524A, and the engaging slot 542D allows for coupling of a mounting platform 506D to the support arm 524A. In embodiments, each mounting platform 506 of each platform pair 510 may be coupled to the support arm 524A at an engaging slot 542. Similarly, each mounting platform 506 of each platform pair 510 may be coupled to the support arm 524B at engaging slots of the support arm 524B.

The mounting platforms 506 couple to the support arms 524 via one or more connecting ledges 544. The connecting ledges 544 may be integral with the mounting platforms 506.

In other embodiments, the connecting ledges 544 may be removably coupled to the mounting platforms 506. For instance, a mounting platform 506 may include a notch or partial bore along its edge 507 to receive a peg or other protrusion of a connecting ledge 544. In some embodiments a mounting platform 506 may include a threaded bore along its edge 507 to receive a screw or other threaded connector extending from a connecting ledge 544. In some embodiments, a mounting platform 506 may include a notch in its edge 507 to receive a protrusion of a connecting ledge 544 by snap-fit means. And in some embodiments, a mounting platform 506 may include a cut-out in its edge 507 to receive a protrusion of a connecting ledge 544 by friction-fit means. It should be appreciated that each mounting platform 506 of the layered actuation structure 500 need not be identical in connection means to a corresponding connecting ledge 544. For instance, the mounting platform 506A may be integral with its corresponding connecting ledge 544A, and the mounting platform 506B may be snap-fit to its corresponding connecting ledge 544B. While embodiments have been described where the mounting platforms 506 include female connectors to receive a male connector of the connecting ledges 544, it should be appreciated that this is a non-limiting example, and in embodiments, the connecting ledges 544 may include female connectors to receive male connectors of the mounting platforms 506. For instance, the connecting ledge 544A may include a threaded bore along its perimeter to receive a screw or other threaded connector extending from the mounting platform 506A. In embodiments where the mounting platforms 506 include a plurality of connecting ledges 544, for coupling to a plurality of support arms 524, for instance, a mounting platform 506 may include a plurality of connecting ledges 544 that connect to the mounting platform 506 by similar connecting means. For example, the connecting ledge 544A may be integral with the mounting platform 506A and a second connecting ledge of the mounting platform 506A may also be integral with the mounting platform 506A. In some embodiments, a mounting platform 506 may include a plurality of connecting ledges 544 that connect to the mounting platform 506 by dissimilar connecting means. For example, the connecting ledge 544A may be integral with the mounting platform 506A and a second connecting ledge of the mounting platform 506A may be coupled to the mounting platform 506A by snap-fit means.

The engaging slots 542 may take any desirable shape. For example, the engaging slots 542 may have cross sections that are rectangular, trapezoidal, elliptical, or the like. Similarly, the engaging slots 542 may take any desirable size or dimensions. The shape and size of the engaging slots 542 generally correspond the shape and size of a corresponding connecting ledge 544. That is, each engaging slot 542 is shaped and sized to receive at least one connecting ledge 544.

In embodiments, each mounting platform 506 of the layered actuation structure 500 includes the same number of connecting ledges 544 for connecting to one or more support arms 524. For instance, the mounting platforms 506A-D may each include two connecting ledges 544 for connecting to the support arms 524A and 524B. In some embodiments where each mounting platform 506 of the layered actuation structure 500 includes the same number of connecting ledges 544, the mounting platforms 506 may connect to the same support arm 524 with an equal number of connecting ledges 544. In other embodiments, however, the mounting platforms 506 may connect to a single support arm 524 with an unequal number of connecting ledges 544. For instance, each mounting platform 506A-D may include a single connecting ledge 544. The connecting ledge 544A of the mounting platform 506A may connect to the support arm 524A, and the connecting ledge 544B of the mounting platform 506B may connect to the support arm 524B. In such an example, the mounting platform 506A may not connect to the support arm 524B, and the mounting platform 506B may not connect to the support arm 524A.

In other embodiments, each mounting platform 506 of the layered actuation structure 500 does not include the same number of connecting ledges 544 for connecting to the support arms 524. In such embodiments, the mounting platforms 506 may each connect to the same support arms 524. For instance, the mounting platform 506A may connect to each of the support arms 524A and 524B with a single connecting ledge 534, respectively, and the mounting platform 506B may connect to each of the support arms 524A and 524B with a pair of connecting ledges 544. That is, the mounting platform 506B may connect to the support arm 524A with two connecting ledges 544 and connect to the support arm 524B with two connecting ledges 544. In other embodiments, the mounting platforms 506 may not each connect to the same support arms 524. For instance, the mounting platform 506A may connect to the support arm 524A with a single connecting ledge 544, and the mounting platform 506B may connect to the support arm 524B with two connecting ledges 544.

In embodiments, a single engaging slot 542 of the support arms 524 may receive a single connecting ledge 544. Therefore, in embodiments where a single mounting platform 506 connects to a single support arm 524 with more than one connecting ledge 544, the support arm 524 may include more than one engaging slot 542 for connecting to the mounting platform 506. For instance, the support arm 524A may include two engaging slots 542 for connecting to the mounting platform 506A. Therefore, the support arm 524A includes the engaging slot 542A for accepting the connecting ledge 544A of the mounting platform 506A and a second engaging slot positioned along the support arm 524A for accepting a second connecting ledge of the mounting platform 506A. Therefore, the second engaging slot may be vertically positioned along the support arm 524A to align with the mounting platform 506A. For example, the second engaging slot may be positioned substantially side-by-side with the engaging slot 542A. In other embodiments, a single engaging slot 542 of the support arms 524 may receive a plurality of connecting ledges 544. Therefore, in embodiments where a single mounting platform 506 connects to a single support arm 524 with more than one connecting ledge 544, the support arm 524 may include a single engaging slot 542 vertically positioned along the support arm 524 for interacting with said mounting platform 506. For instance, the engaging slot 542A may be sized to accept two connecting ledges 544 extending from the mounting platform 506A.

Referring now to FIGS. 8A-10, in operation, when the one or more artificial muscles 100, 100', 300, 300' apply pressure to the cavity-facing surfaces 504 of the one or more actuation platforms 502, the actuation platforms 502 translate relative to the mounting platforms 506 in the movement direction. That is, actuation of the one or more artificial muscles 100, 100', 300, 300' disposed in at least one of the actuation cavities 512 generates a translation motion of the one or more actuation platforms 502 along a cavity displacement distance 530. While the cavity displacement distance may be increased by increasing the number of layers of artificial muscles 100, 100', 300, 300' in embodiments in which artificial muscle stacks are disposed in the actuation cavities 512, the cavity displacement distance 530 is not increased by increasing the number of platform pairs 510. However, the translation motion of an individual actuation platform 502 generates an individual cavity force, which is an additive force.

That is, when the layered actuation structure 500 comprises a plurality of actuation cavities 512, such as in the embodiments depicted in FIGS. 8A and 8B, each individual actuation platform 502 generates an individual cavity force such that the layered actuation structure 500 generates a multi-cavity force. The multi-cavity force is an additive force of each of the individual cavity forces. In some embodiments, the multi-cavity force is 10 Newtons (N) or greater, such as 15 N or greater, 20 N or greater, 25 N or greater, 30 N or greater, 35 N or greater, 40 N or greater, 45 N or greater, 50 N or greater, 55 N or greater, 60 N or greater, 65 N or greater, 70 N or greater, 75 N or greater, 80 N or greater, 85 N or greater, 90 N or greater, 95 N or greater, 100 N or greater, 105 N or greater, 110 N or greater, 115 N or greater, 120 N or greater, or any range having any two of these values as endpoints. Indeed, embodiments are contemplated in which a layered actuation structure 500 comprising a 5 cm×5 cm lateral footprint is capable of generating a multi-cavity force of 80 N.

Referring still to FIGS. 8A-10, the layered actuation structure 500 further comprises an actuation surface 540 configured to apply the cavity force (e.g., an individual cavity force or multi-cavity force) generated by the translational motion of the one or more actuation platforms 502. In some embodiments, the actuation surface 540 is a surface of an actuation block 541, which may be coupled to at least one actuation arm 522, as shown in FIGS. 8A and 8B. In other embodiments, the actuation surface 540 may be a surface of an actuation platform 502 itself, as shown in FIG. 9. In some embodiments, the actuation surface 540 may be a weight bar 560. The weight bar 560 may be a structure extending between two or more actuations arms 522 of the layered actuation structure 500. The weight bar 560 may removably couple to the actuations arms 522. For instance, in some embodiments, the weight bar 560 may include one or more grooves in its bottom surface for receiving the upper edges of the actuation arms 522. The weight bar 560 may support a load. For instance, one or more loads or objects may be supported on an upper surface of the weight bar 560. One or more loads or objects may also be hooked to, or otherwise, suspended by the weight bar 560. The load supported on the weight bar 560 may be distributed to the one or more actuation arms 522, allowing the load to be more evenly distributed to each platform pair 510 of the layered actuation structure 500. In contrast, when the actuation surface 540 is a surface of an actuation platform 502, an undesirably high proportion of the supported load may be directly applied to the platform pair 510 including the actuation platform 502 as the actuation surface 540, and the load may not be evenly distributed to each platform pair 510 of the layered actuation structure 500, through the actuation arms 522, for instance. When the actuation surface 540 supports a load applied to the layered actuation structure 500, it may also be referred to as a load supporting surface herein.

In operation then, a load may be applied to the actuation surface 540 of the layered actuation structure 500, and the artificial muscles 100, 100', 300, 300' of the layered actuation structure 500 may be actuated to apply the cavity force to the actuation surface 540 to perform an amount of work on the load applied to the actuation surface 540, for instance.

With reference to FIGS. 8A and 8B, in ideal operation, the layered actuation structure 500 would dissipate the load applied to the actuation surface 540 evenly to the artificial muscles 100, 100', 300, 300' in each actuation cavity 512 of each platform pair 510. In ideal operation then, the applied load is evenly distributed to each platform pair 510, including the respective actuation platform 502 and mounting platform 506 of each platform pair 510. For instance, a 12 N load applied to the actuation surface 540 would, ideally, be transferred down the actuation arm 522 and across each actuation platform 502 in equal fractions of the 12 N load. For instance, 3 N would be applied to each actuation platform 502A-D (FIG. 10). Moreover, the 3 N force would ideally be distributed from each actuation platform 502A-D, through the artificial muscles 100, 100', 300, 300' associated with each actuation platform 502A-D, to the mounting platforms 506A-D of each platform pair 510, and in turn to the support arm 524. Therefore, the artificial muscles 100, 100', 300, 300' in each actuation cavity 512 of each platform pair 510 need only supply 3 N of force to maintain the layered actuation structure 500 in static equilibrium with a 12 N load applied to the actuation surface 540. That is, by each platform pair 510 supplying 3 N of force, the multi-cavity force of the layered actuation structure 500 may be 12 N.

It has been observed, however, that this ideal operation does not frequently manifest itself in practice. More particularly, the load applied to the actuation surface 540 is often disproportionately distributed across the platform pairs 510 and therefore the artificial muscles 100, 100', 300, 300' of each platform pair 510 of the layered actuation structure 500. As an illustrative example, and with reference to the actuation platforms 502 of the layered actuation structure 500, a 12 N load applied to the actuation surface 540 may result in a 6 N load applied to a first actuation platform 502, a 3 N load applied to a second actuation platform 502, a 2 N load applied to a third actuation platform 502, and a 1 N load applied to a fourth actuation platform 502. More particularly, it has been observed that a significant proportion of the load applied to the actuation surface 540 is transmitted to the actuation platforms 502 nearest the load, and a smaller proportion of the load applied to the actuation surface 540 is transmitted to the actuation platforms 502 farthest the load. For instance, in the above example, the actuation platform 502 nearest the actuation surface 540 in the Y-direction may receive 6 N of the 12 N load, and the actuation platform 502 farthest the actuation surface 540 in the Y-direction may receive 1 N of the 12 N load. Such unequal force distribution throughout the layered actuation structure 500 can result in failure of the layered actuation structure 500. For instance, if each platform pair 510 is loaded with a specific number and arrangement of artificial muscles 100, 100', 300, 300' that are capable of generating a maximum cavity force of 4 N, a disproportionate load distribution that results in a 6 N load being applied to a single actuation platform 502 may overload the artificial muscles 100, 100', 300, 300' acting on said actuation platform 502 to failure. It should be appreciated that the disproportionate load distribution to the actuation platforms 502 described above, similarly results in a disproportionate load distribution to the associated mounting platforms 506 in each platform pair 510. That is, a larger proportion of the load applied to the actuation surface 540 is transmitted to the mounting platforms 506 nearest the load, and a smaller proportion of the load applied to the actuation surface 540 is transmitted to the mounting platforms 506 farthest the load.

Present embodiments are directed to controlling the load distribution of a load applied to the actuation surface 540 of the layered actuation structure 500 across each platform pair 510. More particularly, load transference from the actuation arm 522 to each of the actuation platforms 502 takes place through the connecting ledges 534 (FIG. 10) that couple the actuation platforms 502 to the actuation arms 522, and load transference from the mounting platforms 506 to the support arm 524 takes place through the connecting ledges 544 (FIG. 9). In material sciences and mechanics, loads are distributed differently to components of a structural system based on the stiffness of the components within the structural system. For instance, a load applied to two linked beams may be distributed in a greater proportion to the first beam having a larger stiffness than the second beam. Accordingly, by adjusting the stiffness of the connecting ledges 534 (FIG. 10) coupling the actuation platforms 502 to the actuation arm 522, the distribution of the load through the actuation arm 522 to each connecting ledge 534 (FIG. 10) coupled to the actuation arm 522, and in turn to each actuation platform 502, may be controlled. As a further relationship, by adjusting the stiffness of the connecting ledges 544 (FIG. 9) coupling the mounting platforms 506 to the support arm 524, the distribution of the load from each actuation platform 502 through the artificial muscles 100, 100', 300, 300' to each respective mounting platform 506 and to the support arm 524 may be controlled. That is, by adjusting the stiffness of a connecting ledge 534 of an actuation platform 502 and/or the stiffness of a connecting ledge 544 of a mounting platform of a platform pair 510, the load distribution to the platform pair 510, and therefore the artificial muscles 100, 100', 300, 300' in the actuation cavity 512 of the platform pair 510 may be controlled.

Figure 11:
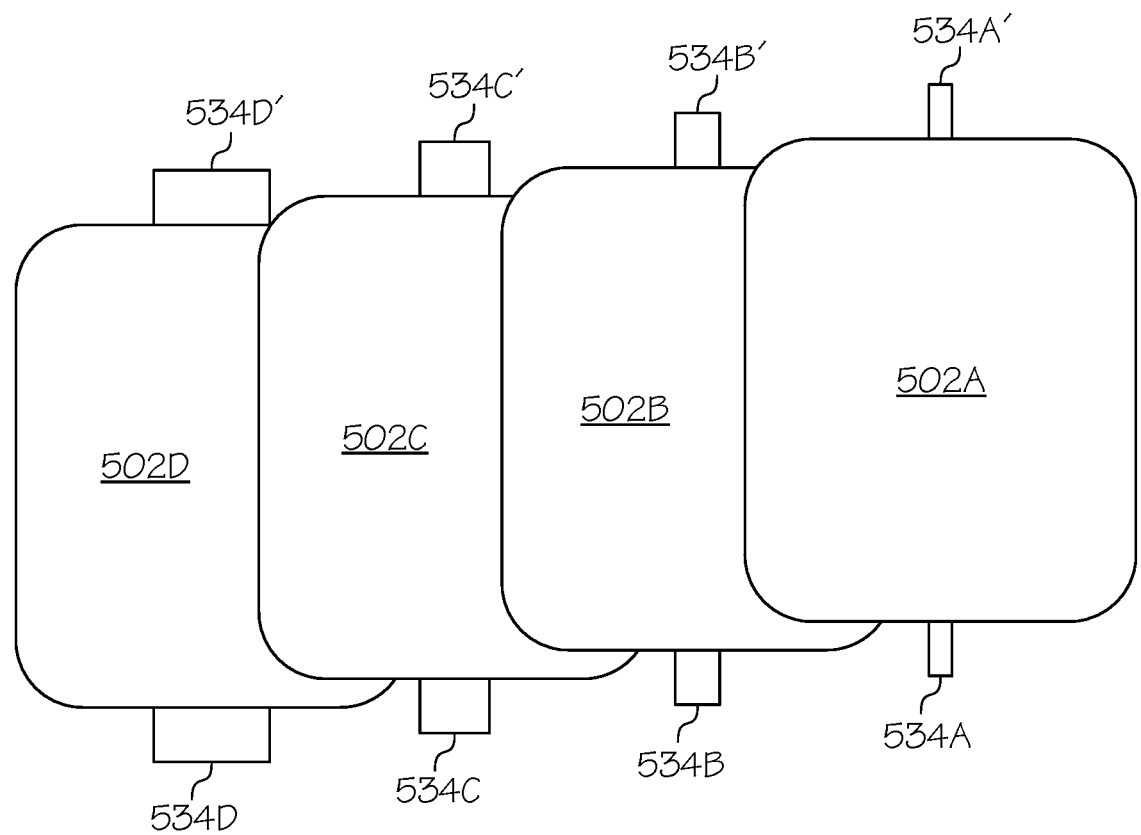
FIG. 11 schematically depicts a plurality of actuation platforms, according to one or more embodiments shown and described herein.

Details of connecting ledge stiffness will now be discussed with reference to the connecting ledges 534 of the actuation platforms 502. However, it should be appreciated that the stiffness of the connecting ledges 544 of the mounting platforms 506 may be similarly controlled and manipulated. With reference to FIGS. 10 and 11, the connecting ledges 534 of the actuation platforms 502A-D may be designed to possess a specific stiffness. Stiffness, as used herein, generally refers to the extent to which an object or material resists deformation in response to an applied load. The stiffness of a connecting ledge 534 may be determined by a plurality of factors, such as the elastic modulus of the connecting ledge 534, which is in turn influenced by material properties (i.e. the one or more materials forming, or contained in, the connecting ledge 534), the length of the connecting ledge 534, the width of the connecting ledge 534, the cross-sectional area of the connecting ledge 534, and the thickness of the connecting ledge 534. The above factors may be referred to as "dimensions" herein. In other words, "dimension" refers to both physical dimensions, such as the length, width, area, and thickness of the connecting ledges 534, and material dimensions, such as the specific type of material or composite of materials that form the connecting ledges 534.

Accordingly, by altering any of the dimensions of a connecting ledge 534, the connecting ledge may possess a specific, desired stiffness. As noted above, in embodiments where each connecting ledge 534 possesses the same stiffness, a load applied to the actuation surface 540 may be unevenly distributed to the actuation platforms 502, with a larger proportion of the load being distributed to the connecting ledges 534 and actuation platforms 502 nearest the applied load. If it is instead desirable to distribute an applied load evenly to each actuation platform 502, the stiffness of connecting ledges 534 coupling the actuation platforms 502 to the actuation arms 522 may be particularly selected. For instance, the connecting ledge 534D may have a greater stiffness than the connecting ledge 534C, which may have a greater stiffness than the connecting ledge 534B, which may have a greater stiffness than the connecting ledge 534A. Therefore, this increasing connecting ledge 534 stiffness, from the connecting ledge 534A nearest the actuation surface 540 to the connecting ledge 534D farthest the actuation surface 540, may counteract the prevalence of the layered actuation structure 500 to distribute a larger proportion of an applied load to the connecting ledges 534 and actuation platforms 502 nearest the actuation surface 540. In other words, the increasing connecting ledge 534 stiffness from the connecting ledge 534A nearest the actuation surface 540 to the connecting ledge 534D farthest the actuation surface 540 may achieve an equal load distribution across each actuation platform 502A-D. As shown in FIG. 11, the increasing connecting ledge 534 stiffness from the connecting ledge 534A nearest the actuation surface 540 to the connecting ledge 534D farthest the actuation surface 540 may be achieved by adjusting the dimensions of the connecting ledges 534A-D. As depicted in FIG. 11, the width of the connecting ledges 534 are varied to achieve a particular stiffness of each connecting ledge 534. However, as discussed above, the stiffness of any or all of the connecting ledges 534 could have similarly been varied by adjusting the length, thickness, area, or material composition of the connecting ledges 534.

However, as discussed in various embodiments above, the actuation platforms 502 may connect to the actuation arms 522 with a plurality of connecting ledges 534. Accordingly, the proportion of a load distributed to each actuation platform 502 may more accurately be determined based on the collective stiffness of the total connecting ledges 534 coupled at actuation arms 522 of each actuation platform 502. For instance, the collective stiffness of the connecting ledges 534 of the actuation platform 502A is the sum of the stiffness of the connecting ledge 534A and the stiffness of the connecting ledge 534A', and the collective stiffness of the connecting ledges 534 of the actuation platform 502B is the sum of the stiffness of the connecting ledge 534B and 534W. In embodiments where the collective stiffness of the connecting ledges 534 of the actuation platform 502B is greater than the collective stiffness of the connecting ledges 534 of the actuation platform 502A, a larger proportion of the load applied to an actuation surface 540 may be distributed to the actuation platform 502B than if the collective stiffness of the connecting ledges 534 of the actuation platform 502B were equal to the collective stiffness of the connecting ledges 534 of the actuation platform 502A. As an illustrative embodiment, the actuation platform 502B may include four connecting ledges 534, and the actuation platform 502A may include two connecting ledges 534. Each of the connecting ledges 534 of the actuation platform 502B may be less stiff than each of the connecting ledges 534 of the actuation platform 502A. However, the collective stiffness of the connecting ledges 534 of the actuation platform 502B may be larger than the collective stiffness of the connecting ledges 534 of the actuation platform.

While illustrative embodiments have been described herein where the stiffness of the connecting ledges 534 of the actuation platforms 502 are determined and selected to achieve an equal distribution of a load across each actuation platform 502 of the layered actuation structure 500 (i.e. to counteract the load distribution effects of a first actuation platform 502 being closer to the applied load than a second actuation platform 502), it should be appreciated that these are non-limiting examples. For instance, in some embodiments, it may be desirable to achieve a specific load distribution across each actuation platform 502, where the specific load distribution is not equal across each actuation platform 502.

While the load distribution of the layered actuation structure 500 has been discussed in detail with respect to the actuation platforms 502 and connecting ledges 534 of the actuation platforms 502, it should be appreciated that the above discussion similarly applies to the mounting platforms 506 and the connecting ledges 544 of the mounting platforms 506. More specifically, by altering any of the dimensions of a connecting ledge 544, the connecting ledge 544 may possess a specific, desired stiffness. As noted above, in embodiments where each connecting ledge 544 possesses the same stiffness, a load applied to the actuation surface 540 may be unevenly distributed to the mounting platforms 506, with a larger proportion of the load being distributed to the connecting ledges 544 and mounting platforms 506 nearest the applied load. If it is instead desirable to distribute an applied load evenly to each mounting platform 506, the stiffness of connecting ledges 544 coupling the mounting platforms 506 to the support arms 524 may be particularly selected. For instance, and with particular reference to FIG. 9, the connecting ledge 544D may have a greater stiffness than the connecting ledge 544C, which may have a greater stiffness than the connecting ledge 544B, which may have a greater stiffness than the connecting ledge 544A. Therefore, this increasing connecting ledge 544 stiffness, from the connecting ledge 544A nearest the actuation surface 540 to the connecting ledge 544D farthest the actuation surface 540, may counteract the prevalence of the layered actuation structure 500 to distribute a larger proportion of an applied load to the mounting platforms 506 and connecting ledges 544 nearest the actuation surface 540. In other words, the increasing connecting ledge 544 stiffness from the connecting ledge 544A nearest the actuation surface 540 to the connecting ledge 544D farthest the actuation surface 540 may achieve an equal load distribution across each mounting platform 506A-D. As shown in FIG. 9, the increasing connecting ledge 544 stiffness from the connecting ledge 544A nearest the actuation surface 540 to the connecting ledge 544D farthest the actuation surface 540 may be achieved by adjusting the dimensions of the connecting ledges 544A-D. As depicted in FIG. 9, the width of the connecting ledges 544 are varied to achieve a particular stiffness of each connecting ledge 544. However, as discussed above, the stiffness of any or all of the connecting ledges 544 could have similarly been varied by adjusting the length, thickness, area, or material composition of the connecting ledges 544.

However, as discussed in various embodiments above, the mounting platforms 506 may connect to the support arms 524 with a plurality of connecting ledges 544. Accordingly, the proportion of a load distributed to each mounting platform 506 may more accurately be determined based on the collective stiffness of the total connecting ledges 544 of each mounting platform 506. For instance, the collective stiffness of the connecting ledges 544 of the mounting platform 506A is the sum of the stiffness of the connecting ledge 544A and any additional connecting ledges 544 extending from the mounting platform 506A and coupled to a support arm 524, and the collective stiffness of the connecting ledges 544 of the mounting platform 506B is the sum of the stiffness of the connecting ledge 544B and any additional connecting ledges 544 extending from the mounting platform 506B and coupled to a support arm 524. In embodiments where the collective stiffness of the connecting ledges 544 of the mounting platform 506B is greater than the collective stiffness of the connecting ledges 544 of the mounting platform 506A, a larger proportion of the load applied to the actuation surface 540 may be distributed to the mounting platform 506B than if the collective stiffness of the connecting ledges 544 of the mounting platform 506B were equal to the collective stiffness of the connecting ledges 544 of the mounting platform 506A. As an illustrative embodiment, the mounting platform 506B may include four connecting ledges 544, and the mounting platform 506A may include two connecting ledges 544. Each of the connecting ledges 544 of the mounting platform 506B may be less stiff than each of the connecting ledges 544 of the mounting platform 506A. However, the collective stiffness of the connecting ledges 544 of the mounting platform 506B may be larger than the collective stiffness of the connecting ledges 544 of the mounting platform 506A.

While illustrative embodiments have been described herein where the stiffness of the connecting ledges 544 of the mounting platforms 506 are determined and selected to achieve an equal distribution of a load across each mounting platform 506 of the layered actuation structure 500 (i.e. to counteract the load distribution effects of a first mounting platform 506 being closer to the applied load than a second mounting platform 506), it should be appreciated that these are non-limiting examples. For instance, in some embodiments, it may be desirable to achieve a specific load distribution across each mounting platform 506, where the specific load distribution is not equal across each mounting platform 506.

As explained above, the distribution of a load to the artificial muscles 100, 100', 300, 300' in each actuation cavity 512 of each platform pair 510 of the layered actuation structure 500 may be an effect of the proportional stiffness of both the connecting ledges 534 of the actuation platform 502 and the connecting ledges 544 of the mounting platform 506 of a first platform pair 510 in relation to a second platform pair 510. In other words, the proportional distribution of a load to the artificial muscles 100, 100', 300, 300' of a first platform pair 510 may be adjusted by varying the collective stiffness of the connecting ledges of the first platform pair 510. The collective stiffness of the connecting ledges of the first platform pair 510 is the sum of the stiffness of the connecting ledges 534 of the actuation platform 502 of the platform pair 510 coupled to an actuation arm 522 and the stiffness of the connecting ledges 544 of the mounting platform 506 of the platform pair 510 coupled to a support arm 524. Accordingly, the collective stiffness of a platform pair 510 may be adjusted by adjusting the stiffness of at least one connecting ledge 534, 544 of the platform pair 510.

Illustrative examples will now be discussed with reference to FIGS. 8A-10. For instance, in embodiments, the platform pair 510B may have a greater collective stiffness than the platform pair 510A. Therefore, a larger proportion of an applied load will be distributed to the artificial muscles 100, 100', 300, 300' housed in the actuation cavity 512 of the platform pair 510B than would be if the collective stiffness of the platform pair 510B were equal to the collective stiffness of the platform pair 510A. The larger proportion of an applied load distributed to the platform pair 510B may or may not be enough to counteract the unequal force distribution to the platform pairs 510A and 510B due to the relative distance of the platform pairs 510A and 510B to the actuation surface 540. In some embodiments, the collective stiffness of the connecting ledges 544B of the mounting platform 506B of the platform pair 510B may be equal to or less than the collective stiffness of the connecting ledges 544A of the mounting platform 506A of the platform pair 510A. However, the collective stiffness of the platform pair 510B may be greater than the collective stiffness of the platform pair 510A due to the collective stiffness of the connecting ledges 534B of the actuation platform 502B of the platform pair 510B being greater than the collective stiffness of the connecting ledges 534A of the actuation platform 502A of the platform pair 510A. In other embodiments, the collective stiffness of the connecting ledges 534B of the actuation platform 502B of the platform pair 510B may be equal to or less than the collective stiffness of the connecting ledges 534A of the actuation platform 502A of the platform pair 510A. However, the collective stiffness of the platform pair 510B may be greater than the collective stiffness of the platform pair 510A due to the collective stiffness of the connecting ledges 544B of the mounting platform 506B of the platform pair 510B being greater than the collective stiffness of the connecting ledges 544A of the mounting platform 506A of the platform pair 510A. In yet other embodiments, the collective stiffness of the connecting ledges 534B of the actuation platform 502B of the platform pair 510B may be greater than the collective stiffness of the connecting ledges 534A of the actuation platform 502A of the platform pair 510A, and the collective stiffness of the connecting ledges 544B of the mounting platform 506B of the platform pair 510B may be greater than the collective stiffness of the connecting ledges 544A of the mounting platform 506A of the platform pair 510A, resulting in the platform pair 510B having a greater collective stiffness than the platform pair 510A.

Referring now to FIG. 12, an actuation system 400 may be provided for operating each individual artificial muscle 100, 100', 300, 300' of the layered actuation structure 500. The actuation system 400 may comprise a controller 50, an operating device 46, a power supply 48, a display device 42, network interface hardware 44, and a communication path 41 communicatively coupled these components.

The controller 50 comprises a processor 52 and a non-transitory electronic memory 54 to which various components are communicatively coupled. In some embodiments, the processor 52 and the non-transitory electronic memory 54 and/or the other components are included within a single device. In other embodiments, the processor 52 and the non-transitory electronic memory 54 and/or the other components may be distributed among multiple devices that are communicatively coupled. The controller 50 includes non-transitory electronic memory 54 that stores a set of machine-readable instructions. The processor 52 executes the machine-readable instructions stored in the non-transitory electronic memory 54. The non-transitory electronic memory 54 may comprise RAM, ROM, flash memories, hard drives, or any device capable of storing machine-readable instructions such that the machine-readable instructions can be accessed by the processor 52. Accordingly, the actuation system 400 described herein may be implemented in any conventional computer programming language, as pre-programmed hardware elements, or as a combination of hardware and software components. The non-transitory electronic memory 54 may be implemented as one memory module or a plurality of memory modules.

In some embodiments, the non-transitory electronic memory 54 includes instructions for executing the functions of the actuation system 400. The instructions may include instructions for operating the layered actuation structure 500, for example, instructions for actuating the one or more artificial muscles 100, 100', 300, 300', individually or collectively, and actuating the artificial muscle layers, individually or collectively.

The processor 52 may be any device capable of executing machine-readable instructions. For example, the processor 52 may be an integrated circuit, a microchip, a computer, or any other computing device. The non-transitory electronic memory 54 and the processor 52 are coupled to the communication path 41 that provides signal interconnectivity between various components and/or modules of the actuation system 400. Accordingly, the communication path 41 may communicatively couple any number of processors with one another, and allow the modules coupled to the communication path 41 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 12, the communication path 41 communicatively couples the processor 52 and the non-transitory electronic memory 54 of the controller 50 with a plurality of other components of the actuation system 400. For example, the actuation system 400 depicted in FIG. 12 includes the processor 52 and the non-transitory electronic memory 54 communicatively coupled with the operating device 46 and the power supply 48.

The operating device 46 allows for a user to control operation of the artificial muscles 100, 100', 300, 300' of the layered actuation structure 500. In some embodiments, the operating device 46 may be a switch, toggle, button, or any combination of controls to provide user operation. The operating device 46 is coupled to the communication path 41 such that the communication path 41 communicatively couples the operating device 46 to other modules of the actuation system 400. The operating device 46 may provide a user interface for receiving user instructions as to a specific operating configuration of the layered actuation structure 500.

The power supply 48 (e.g., battery) provides power to the one or more artificial muscles 100, 100', 300, 300' of the layered actuation structure 500. In some embodiments, the power supply 48 is a rechargeable direct current power source. It is to be understood that the power supply 48 may be a single power supply or battery for providing power to the one or more artificial muscles 100, 100', 300, 300' of the layered actuation structure 500. A power adapter (not shown) may be provided and electrically coupled via a wiring harness or the like for providing power to the one or more artificial muscles 100, 100', 300, 300' of the layered actuation structure 500 via the power supply 48.

In some embodiments, the actuation system 400 also includes a display device 42. The display device 42 is coupled to the communication path 41 such that the communication path 41 communicatively couples the display device 42 to other modules of the actuation system 400. The display device 42 may be a touchscreen that, in addition to providing optical information, detects the presence and location of a tactile input upon a surface of or adjacent to the display device 42. Accordingly, the display device 42 may include the operating device 46 and receive mechanical input directly upon the optical output provided by the display device 42.

In some embodiments, the actuation system 400 includes network interface hardware 44 for communicatively coupling the actuation system 400 to a portable device 70 via a network 60. The portable device 70 may include, without limitation, a smartphone, a tablet, a personal media player, or any other electric device that includes wireless communication functionality. It is to be appreciated that, when provided, the portable device 70 may serve to provide user commands to the controller 50, instead of the operating device 46. As such, a user may be able to control or set a program for controlling the artificial muscles 100, 100', 300, 300' of the layered actuation structure 500 utilizing the controls of the operating device 46. Thus, the artificial muscles 100, 100', 300, 300' of the layered actuation structure 500 may be controlled remotely via the portable device 70 wirelessly communicating with the controller 50 via the network 60.

It should now be understood that embodiments described herein are directed to a layered actuation structure having one or more actuation platforms interleaved with one or more mounting platforms forming platform pairs. Artificial muscles are disposed in an actuation cavity of each platform pair and are expandable on demand to selectively raise the actuation platforms. The translational motion of each of the one or more actuation platforms generates an additive force that may be increased by adding additional platform pairs to the layered actuation structure. The platform pairs include connecting ledges that couple the platform pairs to at least one of a support arm and an actuation arm. The collective stiffness of the connecting ledges of the first platform pair is different than the collective stiffness of the connecting ledges of the second platform pair. The difference in collective stiffness of the connecting ledges of the first and second platform pairs influences the distribution of a load applied to a load supporting surface of the layered actuation structure to each of the first and second platform pairs.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A layered actuation structure, comprising:
   a first platform pair;
   a second platform pair, wherein:
      each of the first platform pair and the second platform pair comprise an actuation platform and a mounting platform, forming an actuation cavity between the actuation platform and the mounting platform of each of the first platform pair and the second platform pair;
      one or more connecting ledges of each platform pair couple at least one of the actuation platform and the mounting platform of each platform pair to at least one of an actuation arm and a support arm, respectively; and
      a collective stiffness of the one or more connecting ledges of the first platform pair is different than a collective stiffness of the one or more connecting ledges of the second platform pair; and
   one or more artificial muscles disposed in the actuation cavity of the first platform pair and the second platform pair.

2. The layered actuation structure of claim 1, wherein the one or more connecting ledges of each platform pair extend from at least one of the actuation platform and the mounting platform.

3. The layered actuation structure of claim 1, wherein a collective stiffness of one or more connecting ledges extending from the actuation platform of the first platform pair is different than a collective stiffness of one or more connecting ledges extending from the actuation platform of the second platform pair.

4. The layered actuation structure of claim 1, wherein a collective stiffness of one or more connecting ledges extending from the mounting platform of the first platform pair is different than a collective stiffness of one or more connecting ledges extending from the mounting platform of the second platform pair.

5. The layered actuation structure of claim 1, wherein a collective stiffness of one or more connecting ledges extending from the actuation platform of the first platform pair is different than a collective stiffness of one or more connecting ledges extending from the mounting platform of the second platform pair.

6. The layered actuation structure of claim 1, further comprising an actuation surface, wherein:
   the first platform pair is a first distance from the actuation surface;
   the second platform pair is a second distance from the actuation surface; and
   the first distance is less than the second distance.

7. The layered actuation structure of claim 6, wherein:
   the actuation surface supports a load; and
   the load is equally distributed to the artificial muscles of the first platform pair and the second platform pair.

8. The layered actuation structure of claim 6, wherein:
   the actuation surface supports a load; and
   the load is unequally distributed to the artificial muscles of the first platform pair and the second platform pair.

9. The layered actuation structure of claim 6, wherein the actuation surface is a weight bar extending between and coupled to a first actuation arm and a second actuation arm.

10. The layered actuation structure of claim 1, wherein the one or more artificial muscles further comprises:
    a housing comprising an electrode region and an expandable fluid region;
    a dielectric fluid housed within the housing; and
    an electrode pair, comprising a first electrode and a second electrode, positioned in the electrode region of the housing, wherein the electrode pair is actuatable between a non-actuated state and an actuated state such that actuation from the non-actuated state to the actuated state directs the dielectric fluid into the expandable fluid region, expanding the expandable fluid region thereby applying pressure to an actuation platform, generating translational motion of the actuation platform.

11. The layered actuation structure of claim 10, wherein:
    the first electrode and the second electrode each comprise two or more radially extending portions and two or more bridge portions;

each of the two or more bridge portions interconnects adjacent radially extending portions; and at least one of the first electrode and the second electrode comprises a central opening positioned between the two or more radially extending portions and encircling the expandable fluid region.

12. The layered actuation structure of claim 10, wherein:
the first electrode and the second electrode each comprise two or more fan portions and two or more bridge portions, wherein:
   each fan portion includes a first end having an inner length, a second end having an outer length, a first side edge extending from the second end, and a second side edge extending from the second end, wherein the outer length is greater than the inner length;
   each bridge portion interconnects adjacent fan portions at the first end of the adjacent fan portions; and
   at least one of the first electrode and the second electrode comprises a central opening positioned between the two or more fan portions and encircling the expandable fluid region.

13. The layered actuation structure of claim 11, wherein:
when the electrode pair is in the non-actuated state, the first electrode and the second electrode are non-parallel to one another; and
when the electrode pair is in the actuated state, the first electrode and the second electrode are parallel to one another, such that the first electrode and the second electrode are configured to zipper toward one another and toward the central opening when actuated from the non-actuated state to the actuated state.

14. A method for actuating a layered actuation structure, the method comprising:
   providing a voltage using a power supply electrically coupled to an electrode pair of one or more artificial muscles, wherein:
      at least one of the one or more artificial muscles are disposed in each of a first and second actuation cavity, wherein the first actuation cavity is formed between an actuation platform of a first platform pair and a mounting platform of the first platform pair, and the second actuation cavity is formed between an actuation platform of a second platform pair and a mounting platform of the second platform pair;
      one or more connecting ledges of each platform pair couple at least one of the actuation platform and the mounting platform of each platform pair to at least one of an actuation arm and a support arm, respectively; and
      a collective stiffness of the one or more connecting ledges of the first platform pair is different than a collective stiffness of the one or more connecting ledges of the second platform pair; and
   applying the voltage to the electrode pair of at least one artificial muscle disposed in one of the first and second actuation cavities, thereby actuating the electrode pair of the at least one artificial muscle from a non-actuated state to an actuated state thereby applying pressure to an actuation platform, generating a translational motion of the actuation platform.

15. The method of claim 14, wherein the one or more artificial muscles further comprises:
   a housing comprising an electrode region and an expandable fluid region; and
   a dielectric fluid housed within the housing, wherein:
      the electrode pair comprises a first electrode and a second electrode; and
      the electrode pair is positioned in the electrode region of the housing, wherein the electrode pair is actuatable between the non-actuated state and the actuated state such that actuation from the non-actuated state to the actuated state directs the dielectric fluid into the expandable fluid region, expanding the expandable fluid region thereby applying pressure to the actuation platform, generating the translational motion of the actuation platform.

16. The method of claim 15, wherein:
the first electrode and the second electrode each comprise two or more radially extending portions and two or more bridge portions;
each of the two or more bridge portions interconnects adjacent radially extending portions; and
at least one of the first electrode and the second electrode comprises a central opening positioned between the two or more radially extending portions and encircling the expandable fluid region.

17. The method of claim 15, wherein:
the first electrode and the second electrode each comprise two or more fan portions and two or more bridge portions, wherein:
   each fan portion includes a first end having an inner length, a second end having an outer length, a first side edge extending from the second end, and a second side edge extending from the second end, wherein the outer length is greater than the inner length;
   each bridge portion interconnects adjacent fan portions at the first end of the adjacent fan portions; and
   at least one of the first electrode and the second electrode comprises a central opening positioned between the two or more fan portions and encircling the expandable fluid region.

18. The method of claim 14, wherein the method comprises applying the voltage to the at least one artificial muscle disposed in each of the first and second actuation cavities thereby generating a translational motion of the actuation platforms of the first and second platform pairs along a cavity displacement distance, the translational motion generating a multi cavity force at an actuation surface, wherein the multi cavity force is an additive force of an individual cavity force generated by each of the first and second actuation cavities.

19. The method of claim 14, further comprising applying a load to an actuation surface, wherein:
   the first platform pair is a first distance from the actuation surface; and
   the second platform pair is a second distance less than the first distance from the actuation surface.

20. The method of claim 14, further comprising applying a load to a weight bar, wherein the weight bar extends between and is coupled to a first actuation arm and a second actuation arm.

* * * * *

UNITED STATES PATENT AND TRADEMARK OFFICE
CERTIFICATE OF CORRECTION

| | |
|---|---|
| PATENT NO. | : 11,601,075 B2 |
| APPLICATION NO. | : 17/217054 |
| DATED | : March 7, 2023 |
| INVENTOR(S) | : Michael P. Rowe, Shardul S. Panwar and Maduran Palaniswamy |

It is certified that error appears in the above-identified patent and that said Letters Patent is hereby corrected as shown below:

In the Specification

In Column 26, Line(s) 43, delete "534W", and insert --534B'--, therefor.

Signed and Sealed this
Eighteenth Day of April, 2023

Katherine Kelly Vidal
*Director of the United States Patent and Trademark Office*